US012794724B2

(12) United States Patent
Kanani et al.

(10) Patent No.: US 12,794,724 B2
(45) Date of Patent: Nov. 10, 2026

(54) DYNAMIC STREAMING DECISION HIERARCHY FOR MULTIPLE AGENT ASSISTANTS

(71) Applicant: MICROSOFT TECHNOLOGY LICENSING, LLC, Redmond, WA (US)

(72) Inventors: Pritesh Rajesh Kanani, Kirkland, WA (US); Madhu Sudan, San Jose, CA (US); Naveen Shrivastava, San Jose, CA (US); Ashish Gujarathi, Parkland, FL (US); Poorva Vinod Agrawal, Sunnyvale, CA (US)

(73) Assignee: Microsoft Technology Licensing, LC, Redmond, WA (US)

( * ) Notice: Subject to any disclaimer, the term of this patent is extended or adjusted under 35 U.S.C. 154(b) by 11 days.

(21) Appl. No.: 19/092,991

(22) Filed: Mar. 27, 2025

(65) Prior Publication Data

US 2026/0303390 A1 Oct. 1, 2026

(51) Int. Cl.
*H04L 12/18* (2006.01)

(52) U.S. Cl.
CPC ...... *H04L 12/1822* (2013.01); *H04L 12/1818* (2013.01)

(58) Field of Classification Search
None
See application file for complete search history.

(56) References Cited

U.S. PATENT DOCUMENTS

| | | | | |
|---|---|---|---|---|
| 7,447,608 B1 * | 11/2008 | Poston | H04L 12/1822 | 702/187 |
| 7,761,393 B2 * | 7/2010 | Macbeth | G06Q 10/10 | 709/205 |
| 10,178,056 B2 * | 1/2019 | Cunico | H04L 67/54 | |
| 10,693,824 B2 * | 6/2020 | Silva | H04L 51/04 | |
| 10,873,611 B2 * | 12/2020 | Zlatarev | G06F 3/0481 | |
| 11,095,468 B1 * | 8/2021 | Pandey | H04L 12/1831 | |
| 11,271,978 B2 * | 3/2022 | Ranalli | H04L 65/4015 | |
| 11,282,036 B1 * | 3/2022 | Hood | G06Q 10/103 | |
| 11,568,337 B2 * | 1/2023 | Nandi | G10L 15/26 | |
| 11,627,006 B1 * | 4/2023 | Chew | H04L 51/02 | 704/275 |
| 11,689,379 B2 * | 6/2023 | Daredia | G06F 16/483 | 709/204 |
| 12,388,831 B2 * | 8/2025 | Nagar | G06F 9/453 | |
| 12,554,940 B2 * | 2/2026 | Maurer | G06F 16/345 | |
| 2004/0002887 A1 * | 1/2004 | Fliess | G06Q 10/063112 | 705/7.14 |

(Continued)

*Primary Examiner* — Backhean Tiv

(74) *Attorney, Agent, or Firm* — Scott Y. Shigeta; Newport IP, LLC

(57) ABSTRACT

The techniques disclosed herein provide a dynamic streaming decision hierarchy for multiple artificial intelligence (AI) agent assistants in meeting systems. A system dynamically assigns different specialized AI agents to meeting attendees having different assigned roles, each agent performs a specialized set of functions mapping/matching to that role. In some embodiments, the system determines a task to be accomplished based on various sources, determines roles needed for the task, and assigns the roles to meeting participants. The role-dependent AI agents are then used to guide and coach each meeting participants attendee to perform functions that map to the determined roles.

20 Claims, 13 Drawing Sheets

(56) References Cited

U.S. PATENT DOCUMENTS

| | | | | |
|---|---|---|---|---|
| 2009/0089133 | A1* | 4/2009 | Johnson | G06Q 10/109<br>705/7.21 |
| 2016/0041849 | A1* | 2/2016 | Naveh | G06F 9/5027<br>718/104 |
| 2018/0046957 | A1* | 2/2018 | Yaari | G06Q 10/109 |
| 2019/0172017 | A1* | 6/2019 | Burlin | G06Q 10/00 |
| 2019/0340581 | A1* | 11/2019 | Pena Ocampo | H04L 12/1818 |
| 2020/0372436 | A1* | 11/2020 | Lee | G06Q 10/063112 |
| 2021/0201247 | A1* | 7/2021 | Shelke | G06N 20/00 |
| 2021/0365896 | A1* | 11/2021 | Davuluri | G06F 16/345 |
| 2024/0112124 | A1* | 4/2024 | Manikantan | G06Q 10/06398 |
| 2024/0205037 | A1* | 6/2024 | Callegari | H04L 12/1831 |
| 2024/0249213 | A1* | 7/2024 | Agrawal | G06Q 10/063112 |
| 2024/0250838 | A1* | 7/2024 | Liu | G06T 11/26 |
| 2024/0259440 | A1 | 8/2024 | Springer | |
| 2025/0315626 | A1* | 10/2025 | Naik | G06F 40/35 |
| 2025/0356313 | A1* | 11/2025 | Pollock | G06Q 10/101 |

* cited by examiner

DYNAMIC STREAMING DECISION HIERARCHY FOR MULTIPLE AGENT ASSISTANTS

BACKGROUND

There are a number of different types of collaborative systems that allow users to communicate. For example, some systems allow people to collaborate by sharing content using video streams, audio streams, shared files, chat messages, etc. Some systems manage communication sessions, which are also individually referred to herein as an online meeting, meeting, virtual reality session, broadcast, etc. Such sessions can have a distinct start time and an end time that occur on specific dates. Some existing systems provide a number of tools that allow participants to share content in the form of audio streams, video streams, chat messages, screen sharing features, etc. The content can be shared before, during and after the meeting.

Although some existing systems provide a number of features that allow people to collaborate during specific events, some systems do not provide effective tools that help meeting participants efficiently identify tasks or identify the right people to perform the tasks. Some existing solutions for virtual meeting management primarily rely on static configurations, predefined rules, or user-driven workflows to assign roles, manage agendas, and resolve conflicts. These systems often lack the ability to adapt dynamically to real-time changes in meeting dynamics. This can result in a misalignment in how tasks are assigned and performed. Resources that are not dynamically adjusted in real-time do not optimally utilize computing resources, as changed scenarios may eliminate the need for assigned tasks. When systems do not adapt to such scenarios, resources are used to perform tasks that are no longer needed.

SUMMARY

The techniques disclosed herein provide a dynamic streaming decision hierarchy for multiple artificial intelligence (AI) agent assistants in meeting systems. A system dynamically assigns different specialized AI agents to meeting attendees having different assigned roles. Each agent performs a specialized set of functions mapping/matching to that role. In some embodiments, the system first determines tasks to be accomplished based on live and historical content related to a meeting. The system then determines roles needed for the tasks, and assigns the roles to select meeting participants. Role-dependent AI agents are then deployed and assigned to guide and coach the meeting participants to perform functions that map to the determined roles.

The disclosed techniques are unique in their integration of game-theoretical models, such as Nash equilibrium, and Pareto optimization, to make real-time, data-driven decisions. By continuously analyzing participant engagement, expertise, and preferences, it assigns roles dynamically, adjusts the agenda, and resolves conflicts in ways that are optimal and contextually relevant, something traditional systems do not achieve.

In one illustrative example, in an online meeting, an AI engine determines and assigns a role to individual attendees of the meeting according to: (1) information from a meeting agenda; (2) context of live meeting discussions and gestures; (3) organization data (e.g., org chart, positions, roles). The system may first determine a task to be accomplished through the meeting according to (1) an agenda; (2) prior or parallel communications relating to the meeting (e.g., chats, emails, etc.), public or private; (3) context of live discussion (from both audio and video streams of a meeting) that is gathered on-the-fly. The system may decide, based on the type of task of the meeting, specific roles needed for the determined type of task. The system may assign roles to only a select subset of the participants, instead of every participant in a meeting. The selection of the subset may be based on (1) who the active speakers are; (2) prior or parallel communications with the meeting; (3) context of the meeting discussion; (4) org chart (5) agenda.

Once the system determines various roles for the attendees, the system provides, on-the-fly, to a specific attendee a specialized AI agent specific to the role of that attendee, to guide and coach the attendee to perform functions mapping to the role. The system provides different agents to attendees with different roles based on the determination of the role. For a role shared by multiple attendees in the meeting, the system tracks interactions of each agent and each attendee of that role, and needed functions for that role. If a needed function is performed by one of the attendees of that role, the system does not surface similar function or guidance to other attendees in that role.

The efficiency of the system is improved by providing role-dependent AI agents that are configured to perform specialized tasks according to the roles of each of the selected users. In one example, a technical problem of inefficient use of AI agents in existing systems is solved by a technical solution of assigning specialized AI agents to individuals that are assigned to a specific role and one or more corresponding tasks. Computing resources are used efficiently because agents are only dynamically deployed when they are needed, e.g., when a task and roles are identified. Real-time analysis of meeting activity allows a system to dynamically deploy role-dependent agents when they are needed and dynamically and remove role-dependent agents when they are not needed, instead of having a number of agent instances deployed at all times or during times when the demand for a role-dependent agent is below a threshold.

In addition, by providing role-specific specialized AI agents, the agents can provide more granular functionality to perform specific tasks, instead of providing a general AI agent for each person. For example, since all AI models have a token limit, an agent can be limited in the grounding data and instructions that are included in a prompt. More generalized AI agents that can are not specialized, or trained in a particular set of functions, may require longer prompts to a point where the token limit can restrain the grounding data and instructions in a query, thus limiting the accuracy and/or completeness of an output. In addition, the disclosed techniques provide an AI system that can continuously and dynamically monitor a meeting to adjust the agent assignments based on new scenarios and changing meeting dynamics.

Other technical benefits are also achieved by providing improved security of a system. The system determines roles for meetings and thus can control access permissions for each role. Security is improved by controlling permissions at a granular level that is based on real-time analysis of meeting content.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
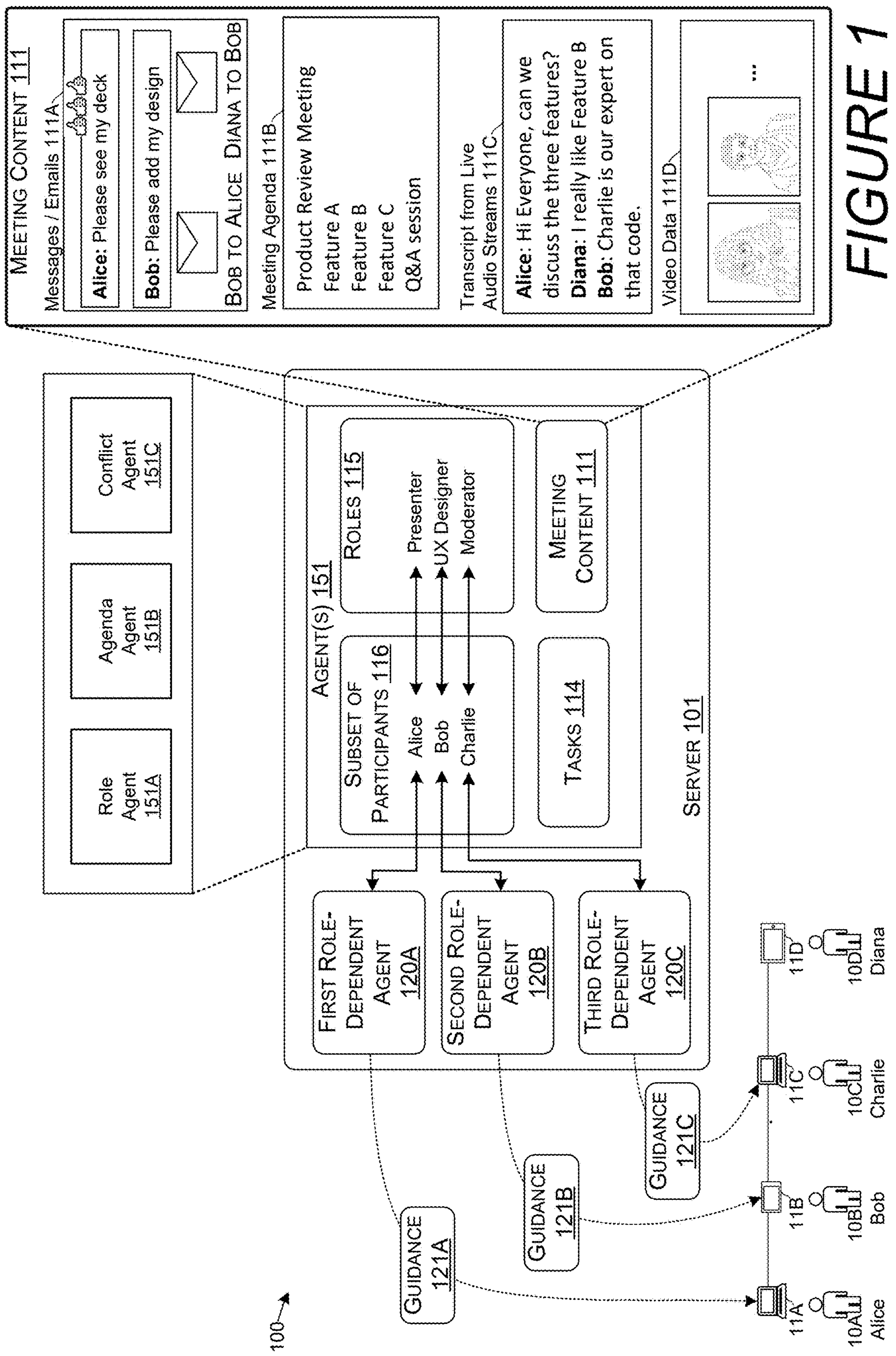
FIG. 1 is a block diagram of a system that provides a dynamic streaming decision hierarchy for multiple agent assistants.

FIG. 1 shows a system 100 for providing a dynamic streaming decision hierarchy for multiple artificial intelligence (AI) agent assistants in meetings. The system dynamically assigns different specialized AI agents to meeting attendees having different assigned roles, each agent performs a specialized set of functions mapping/matching to that role. In some embodiments, the system first determines tasks to be accomplished based on a number of different sources of live and historical information, determines roles needed for the tasks, and assigns the roles to meeting participants. The role-dependent AI agents are then used to guide and coach each meeting participants attendee to perform functions that map to the determined roles.

The disclosed techniques are unique in their deep integration of game-theoretical models, such as Nash equilibrium and Pareto optimization, to make real-time, data-driven decisions. By continuously analyzing participant engagement, expertise, and preferences, it assigns roles dynamically, adjusts the agenda, and resolves conflicts in ways that are mathematically optimal and contextually relevant, something traditional systems do not achieve.

For illustrative purposes, consider an example where a meeting has a number of participants including Alice, Bob, Charlie, and Diana. During the meeting, the system dynamically evaluates each participant based on their personality and preferences. In this scenario, by the use of the meeting content 111 that is collected by the system, the system determines that Alice is more of a marketer who has expertise in finance and has a high engagement in the meeting, Bob has technical expertise and has a moderate engagement in the meeting, Charlie is a Manager and decision-maker who has an agenda and low engagement in the meeting, and Diana has Operations expertise, has another agenda, and is a high engagement in the meeting. The meeting content can include any type of content that is exchanged for a meeting, which can be communicated before, during or after a meeting. The meeting content can include messages or emails, a meeting agenda, transcripts from live audio streams, recordings from past meetings, and video data which can capture gestures performed by the participants. Other information that can be utilized can include shared documents, web information related to each participant, e.g., LinkedIn profiles, or any other resource that can provide contextual information about the shared content or the participants.

For illustrative purposes, the system 100 utilizes an agent 151, which utilizes a large language model (LLM) for processing the meeting content 111 to generate tasks 114, roles 115, and a selection of a subset of participants 116. The agent can also be used to manage the deployment and assignment of role-dependent agents 120. Although the agent 151 is referred to as a single agent, the system can utilize any number of specialized agents. In some embodiments, the system can utilize a number of specialized agents such as a Role Agent 151A that assigns roles using Nash equilibrium, an Agenda Agent 151B that adjusts agenda items using sequential game theory, and a Conflict Agent 151C that resolves conflicts using Pareto optimization. For illustrative purposes, the Role Agent 151A, Agenda Agent 151B, and the Conflict Agent 151C can be collectively referred to as the "agent 151."

In one illustrative example, the Role Agent 151A aligns a particular conversation psychologically to maximize the outcome of the meeting or maximize the outcome of the conversation. The system can determine tasks for certain roles, e.g., the system can determine what a moderator actually does. For example, if one person is an executive assistant, that person is reviewing the questions and moderating an agenda for the participants. So, in this case, the system utilizes AI to understand everyone's preferences and actions. The system can then determine what discussion would lead to the best outcome, or the most efficient outcome for the meeting. The system can then assign tasks and/or assign specialized AI assistants 120 to people that would make the meeting more efficient. So, the system is hyperspecializing on a module or an LLM module that is developed for efficiency to be able to provide the right agent(s) for the right participants.

TABLE 1 below shows one example of how the system determines role assignments using Nash equilibrium. In this example, the scores of each participant are adjusted in real time dynamically by the system agent, such as the Role Agent, for each participant. In this example, each participant has utility scores for each role based on their expertise and engagement. The meeting content can be analyzed to determine each person's expertise, this can include accessing profiles, shared files, live video and audio communication, live chat threads, historical chat threads, emails, an on-line profile, an org chart, or any other forms of content pertaining to each person. The engagement can also be based on the meeting content with a focus on their activity in the meeting, e.g., a context of shared statements, emails, messages, or gestures captured for a meeting. For example, if a number of participants state that Alices has more experiences as a presenter and Alice is active in a conversation, Alice would receive a higher score in that role category. The score can be based on a number of occurrences of relevant statements, a priority of topic of each statement, or a number of occurrences of other related communication. For example, if live chat messages and live voice communications from a person indicate that a particular topic is important for a presentation they have experience with, such communication can increase the score for a presenter role for that person.

The score can also indicate a factor of importance. For example, a higher score corresponds to urgent matters such as either critical for adoption, or a meeting participant is talking about customer focused issue or critical for the product or stability. These factors have a score that is greater than a threshold level of urgency. A lower score corresponds to non-urgent matters such as a user talking about cost constraints or something that a person can complete in four months from the meeting time. These factors have a score that is less than a threshold level of urgency. In some embodiments, the system finds combinations where no participant can increase their utility by unilaterally switching roles.

TABLE 1

| Nash Utility Scores | | | |
|---|---|---|---|
| Participant | Presenter (P) | UX designer (X) | Moderator (M) |
| Alice | 8 | 5 | 4 |
| Bob | 6 | 7 | 5 |
| Charlie | 4 | 5 | 8 |
| Diana | 7 | 6 | 6 |

The result of these examples scores is that Alice is assigned the role as the Presenter, Bob is assigned the role as the UX designer, and Charlie is assigned the role as the Moderator. Also, based on such scores, Diana remains unassigned for a role but contributes as a participant. In some embodiments, the system can first determine the tasks, e.g., presenter, UX Designer, and moderator, and then assign the roles based on the tasks. Once roles are assigned, the system can dynamically deploy and assign role-dependent agents for each of the selected participants (also referred to herein as the "subset of participants").

The system can update the scores as new meeting content is received. For example, when a person makes a statement, performs a predetermined gesture that is captured by a camera, sends a message or email, a new person with a particular experience joins the meeting, etc., updates to the scores can be made. Updates to the scores are also made when the system detects such changes to an agenda, an organizational chart, or other related information, including but not limited to, modifications to a person's LinkedIn profile, blog, website, etc. This dynamic allocation helps with updates to tasks and roles. These dynamic changes also help the system to efficiently assign agents when they are needed.

In addition, this dynamic streaming decision hierarchy for multiple agent assistants allows the system to run resources more efficiently since agents can be dynamically assigned and removed based on the changing situation in a meeting. For example, when one or more select scores is above a threshold for a predetermine time, e.g., Alice's presenter score, the system may assign a task, role, and a corresponding agent for those individual participants. When the one or more select scores are below the threshold for the predetermine time, the system may remove the assigned task, role, and/or the corresponding agent for that individual participant. Assigned roles, tasks and agents can be dynamically changed based on a continual, real-time analysis of the meeting content and the participant activity.

In some configurations, the system utilizes the Agenda Agent 151B to adjust priorities to agenda items using sequential game theory. In general, each topic can have a priority, and each topic is prioritized for each participant based on an assigned score. For example, as shown in TABLE 2 below, if a person in a meeting said "budget planning should have a higher priority than Ops workflow," the system generates a dynamic prompt that sends such communication, indicating that budget planning is a higher priority than Ops workflow, to the agent.

In addition, the agent receives additional data indicating the contribution of each participant for each topic. For instance, if Alice presents content about budget planning and Diana is also presenting content about budget planning, the system can provide such information to the agent in the form of a dynamically generated prompt that provides an indicating that the two of them who want to talk about budget planning. The system can also provide data to the agent, including any live conversation during the meeting, any chat message, emails, transcripts from previous meetings, documents, gestures that are made during the meeting, online information including profile information, etc. This allows scores to be generated per person per topic, and such scores can be adjusted based on updates to such information. Selected topics or topics having a threshold ranking can be cause the system to select a related tasks, e.g., a selection of a budget planning topic causes the system to generate a task for planning a budget.

TABLE 2

| Agenda Priorities | | | |
|---|---|---|---|
| Participant | Budget Planning | Technical Roadmap | Ops Workflow |
| Alice | 9 | 5 | 6 |
| Bob | 5 | 9 | 7 |
| Charlie | 6 | 6 | 8 |
| Diana | 7 | 8 | 9 |

Aggregate scores for each item.
Unweighted Scores
Budget Planning: 9+5+6+7=27
Technical Roadmap: 5+9+6+8=28
Ops Workflow: 6+7+8+9=30

The result can include an Agenda order of:

Ops Workflow→Technical Roadmap→Budget Planning

Outcome: The agenda dynamically reorders the topics to maximize utility.

The Agenda Agent can also calculate weighted scores using a sequential game-theoretical approach, factoring in priorities and time constraints. The following examples have weighted scores based on Time, Equity and Fairness:

When it comes to time, the weights applied to the scores may dynamically change as a conversation progresses. For instance, the system may reduce the weight of the scores for budget planning as the conversation pertaining to budget planning comes to a close, or when an allocated time is running out, and a time for a conversation pertaining to the Technical Roadmap starts. The weight applied to Ops Workflow can also be reduce since a time for that conversation is in the future after the Technical Roadmap conversation.

Budget Planning: 9 (0.6)+5 (0.6)+6 (0.6)+7 (0.6)=16.2

Technical Roadmap: 5 (1.2)+9 (1.2)+6 (1.2)+8 (1.2)=33.6

Ops Workflow: 6 (0.5)+7 (0.5)+8 (0.5)+9 (0.5)=15

The result can include an Agenda order of:

Technical Roadmap→Budget Planning→Ops Workflow

Outcome: The agenda dynamically reorders the topics to maximize utility.

Then, as the conversation for the Technical Roadmap comes to a close and they start to transition to the Ops Workflow conversation, the weights for the Technical Roadmap would be reduced and the weights for the for the Ops Workflow would increase. In such a scenario the weights for the Budget Planning scores are reduced further or the scores are reset to zero if the conversation is complete on that subject. By using dynamically modified weights, the system can treat time as a resource.

Budget Planning: 9 (0.1)+5 (0.1)+6 (0.1)+7 (0.1)=2.7

Technical Roadmap: 5 (0.6)+9 (0.6)+6 (0.6)+8 (0.6)=16.8

Ops Workflow: 6 (1.5)+7 (1.5)+8 (1.5)+9 (1.5)=45

The result can include an Agenda order of:

Ops Workflow→Technical Roadmap→Budget Planning

Outcome: The agenda dynamically reorders the topics to maximize utility.

Based on such scores and the application of weights to the scores, the system provides allocations, e.g., time on an agenda, or by giving guidance, e.g., by a computer-generated voice input or a computer-generated chat message, for Alice and Diana to start the meeting. In some embodiments, the system monitors the conversation to determine when the conversation on those topics is complete. Once the discussion of those topics are done, the system changes the scores to zero (0) dynamically. This reorders the agenda synchronously with the activity of the meeting. in some configurations, the system can select and rank topics, roles or tasks of a meeting using this scoring technique.

In another example, when it comes to equity and fairness, when a person has reached a threshold in an amount of time that is allocated to them on a topic, the weights may change with respect to that person, and other weights may increase for other users. The weights can dynamically change to give someone else the floor. The system may give someone else the floor by changing permissions to microphones or providing notifications, e.g., muting some users that are over their allocation or by displaying reminders or chat messages. For example, the weights shown in TABLE 3 may result if Bob has talked for more than a threshold time and Alice has talked less than a threshold time. This could cause the system to provide guidance to the users by prompting Alice to speak more or by changing permissions to user microphones, e.g., muting Bob's microphone. Such score weights can also change the way topics are selected or the way an agenda item is ranked, e.g., by adding the weighted scores of the topics.

TABLE 3 weighted scores for equity and fairness

| Participant | Budget Planning | Technical Roadmap | Ops Workflow |
|---|---|---|---|
| Alice | 9 (1.2) | 5 (1.2) | 6 (1.2) |
| Bob | 5 (.1) | 9 (.1) | 7 (.1) |
| Charlie | 6 (1) | 6 (1) | 8 (1) |
| Diana | 7 (1) | 8 (1) | 9 (1) |

In another example, embodiments involving time, equity and fairness include operations for determining that a first user contributed a quantity of the content greater than a threshold quantity of meeting content, wherein the quantity of the content can include a number of words spoken, a length of time of vocal input to a meeting, or a value quantifying shared comments or shared documents. In response to determining that the first user contributed the quantity of the content greater than the threshold quantity of meeting content, the system can take two actions. First, the system can adjust the priority scores for the first user to reduce a priority of a task or a priority of a role for the first user, wherein the selection of the first user as being in the subset of participants is based on the priority of the task or the priority of the role for the first user being above a threshold priority. Second, the system can adjust priority scores for a second user to increase a priority of a task or a priority of a role for the second user, wherein the selection of the second user as being in the subset of participants is based on the priority of the task or the priority of the role for the second user being above the priority threshold.

The system can provide guidance in a number of ways. In one example, the system can provide guidance in the form of a chat message. The chat message can make suggestions on what the participants should talk about, or reminders to return to a topic, etc. The guidance can also be in the form of a virtual participant sending reminders using a computer-generated voice to guide the conversation to specific topics. The guidance can be more suggestive than intrusive, e.g., help suggest by chat, by live stream, or computer-generated voice audio.

In some configurations, the system can monitor the activity of a meeting and identify conflicts. The system can provide the meeting content indicating the conflict, e.g., transcripts of the live conversation, to the Conflict Agent 151C to generate an output that resolves the detected conflicts. In one illustrative example, a conflict can be detected when two people make conflicting statements about a particular topic. One person may say that a first topic is a high priority and another person can say that a second topic is also a high priority. When the system detects such a scenario, the system can model the disagreement and derive a modification action to the agenda.

For illustrative purposes, consider the following example using a Pareto score calculation. In this example, Alice and Bob disagree on the priority of Budget Planning (Alice's priority) vs. Technical Roadmap (Bob's priority). The Conflict Agent models their disagreement as:

1. Utility matrix for Alice (A) and Bob (B):

Budget Planning: (A: 9, B: 5)

Technical Roadmap: (A: 5, B: 9)

Compromise Solution (Hybrid Discussion): (A: 7, B: 7)

2. Pareto-optimal solutions:
   - Budget Planning favors Alice but leaves Bob suboptimal.
   - Technical Roadmap favors Bob but leaves Alice suboptimal.
   - Hybrid Solution provides a balanced outcome without disadvantage either party.

Outcome: The Conflict Agent proposes a hybrid discussion where 15 minutes are allocated to each topic, achieving Pareto efficiency (A: 7, B: 7).

As the meeting progresses, each participant is guided by the agent(s) 151 to keep the meeting on schedule according to an agenda and also reduce the number of conflicts. The system can also determine tasks and roles, and then assign those roles to a select subset of the participants. Role-dependent Agents are then deployed and assigned for each participant of the subset of the participants to help them complete tasks associated with their assigned roles. In one illustrative example, the system can determine that a subsequent meeting is needed as a follow up. The system can invite each of the subset of participants to the subsequent meeting, assign roles for each participant, and then build an agenda for that meeting. The assigned role-dependent agents can assist each user by providing guidance in the form of messages or by computer-generated voice communication, generate content, e.g., slide decks, and help each participant with general workflow tasks.

Figure 2A:
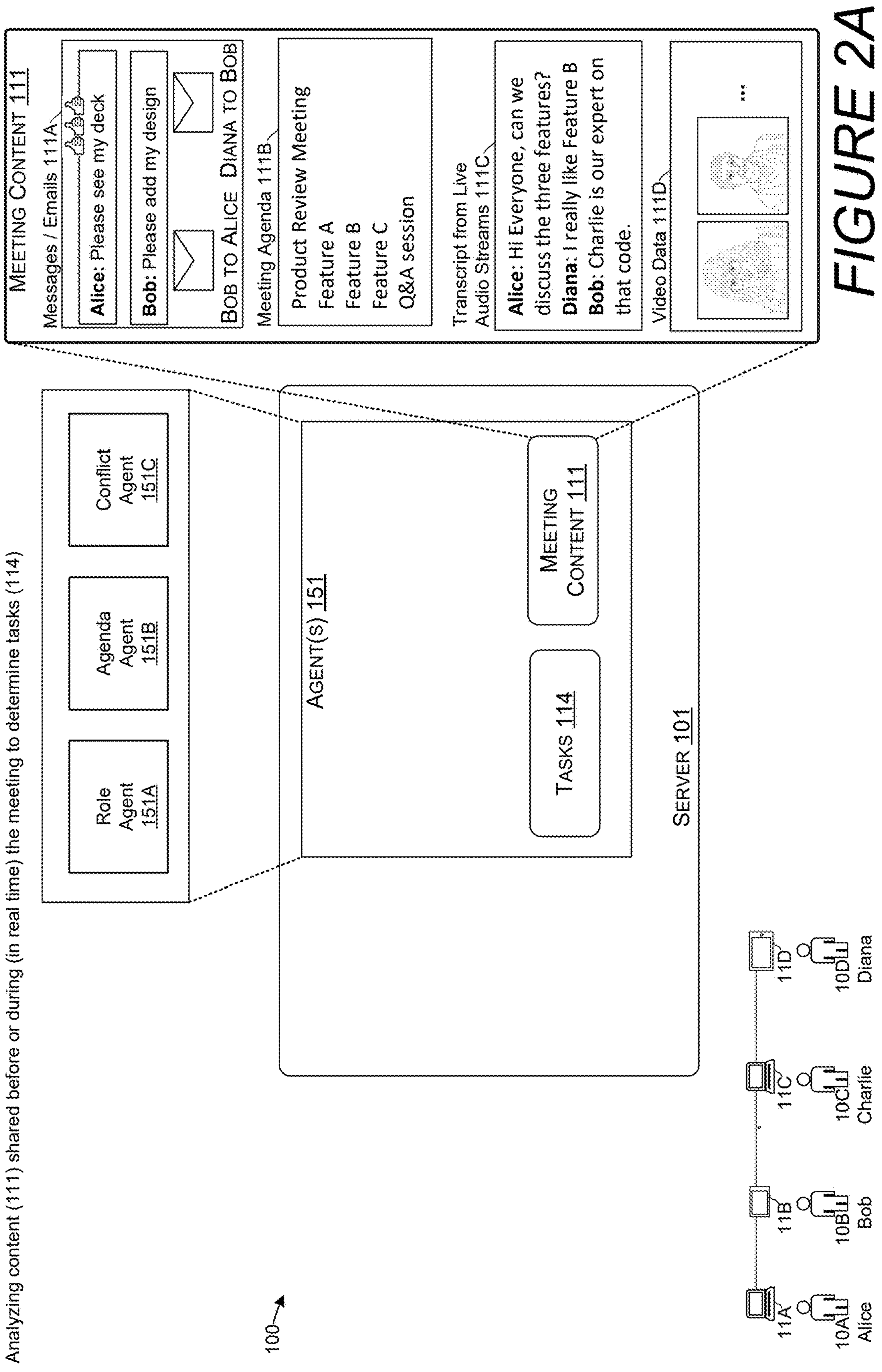
FIG. 2A shows a state where the system determines tasks by analyzing meeting content shared before or during the meeting.

Referring now to FIGS. 2A-2F, a individual stages of a process for managing agents for individual participants is shown and described below. As shown in FIG. 2A, the system first determines a task based on meeting content, such as, but not limited to, an agenda; prior or parallel communications relating to the meeting e.g., voice streams, video streams, chats, emails, etc., public or private; and a context of the discussion that is gathered on-the-fly. In some embodiments, the system can analyze content 111 shared before or during the meeting to determine tasks 114 associated with the meeting. The tasks 114 are each determined from analysis of at least one of a meeting agenda 111B, prior or parallel message communications 111A relating to the meeting, and a context of live vocal communication discussion 111C between the plurality of participants 10. The prior or parallel message communications (111A) relating to the meeting include emails or messages that are to or from any one of the participants of the meeting. In addition, the meeting content 111 further includes the agenda authored or edited by any one of the participants of the meeting. The context of live vocal communication discussion (111C) between the plurality of participants (10) is derived from an analysis of a live and historical transcription of audio streams communicated between the participants of the meeting, the analysis including communicating the live and historical transcription of audio streams to a large language model (LLM) with instructions causing the LLM to determine the context of the live vocal communication discussion.

Figure 2B:
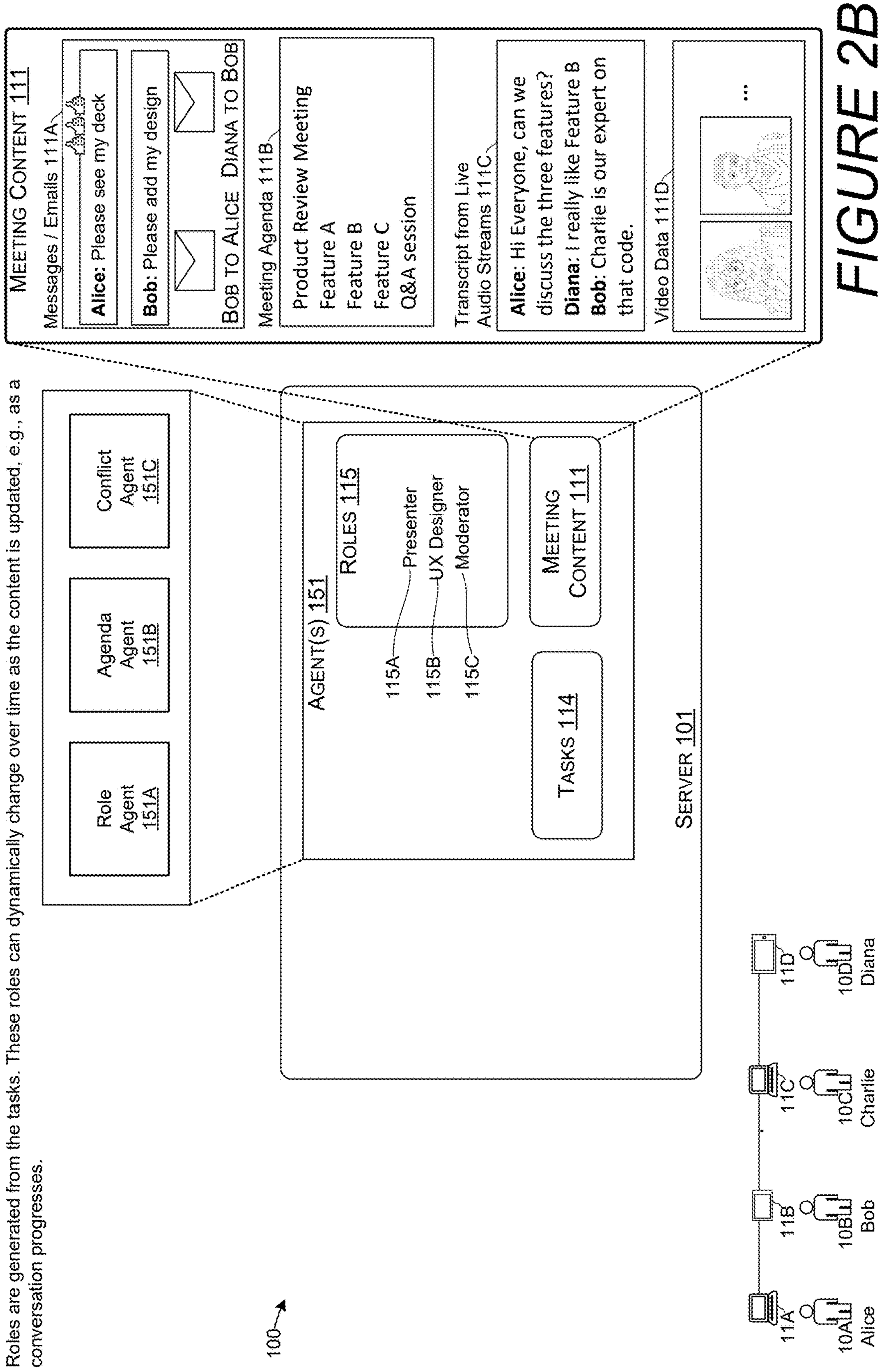
FIG. 2B shows a state where the system is generating roles based on the determined tasks.

As shown in FIG. 2B, the system can determine specific roles needed for the determined tasks. For example, if a task of organizing a meeting is determined by the system, the system associates that task with a role that best suits the determined task. This determination may be based on a type of task or a class of tasks. For example, the system may select a Speaker Role in response to a requirement of the task having a matching a skillset of that role. For example, a task may require a person with experience and/or education in presentations, or specific experience in giving presentations to a particular audience, etc. In response to such requirements of the identified task, the system may select the Speaker Role since that role has an associated skillset, e.g., a relevant education, training, or experience with presentations, that matches with the requirements of the task.

The skillset of the role and the requirements of the tasks can be predetermined by a system or they can be obtained by an analysis of the meeting content. For example, messages or from verbal communication in a meeting can describe a task, e.g., a statement from a user "We need a person with experience to fix the UI of the application." When such a statement is detected from a live conversation, the system can identify the task: the UI of the application needs to be fixed. The system can also identify that the skillset of a UX Designer role includes a person with experience or education in designing and fixing user interfaces. When the skillset of the role and the requirements of the tasks have a threshold match, the UX Designer role can be selected from the task of "the UI of the application needs to be fixed."

Figure 2C:
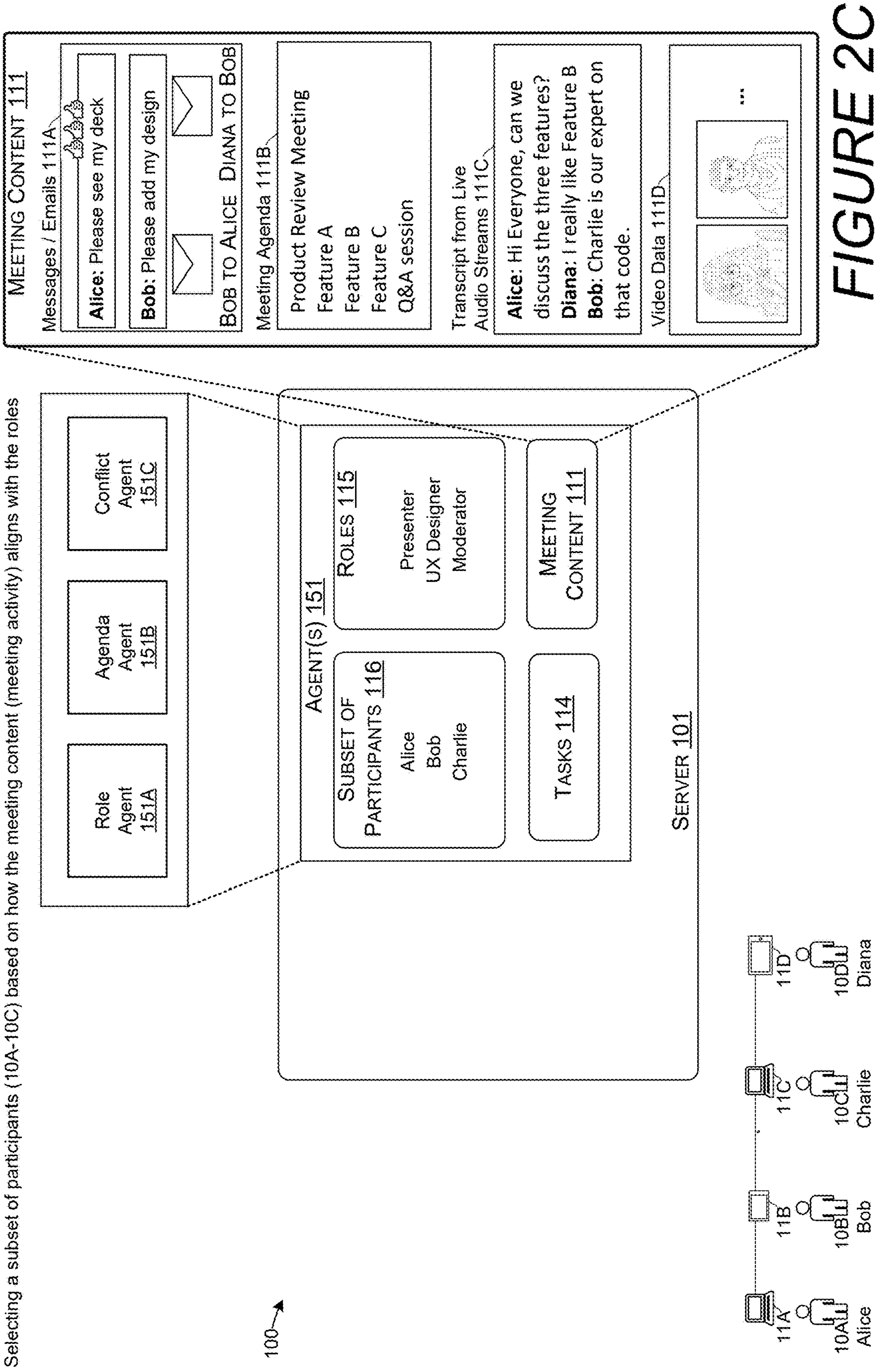
FIG. 2C shows a state where the system is selecting a subset of participants based on how the meeting content aligns with the roles.

As shown in FIG. 2C, the system selects a subset of participants based on the roles. In some embodiments, this selection can be based on the Nash selection of the subset of participants described above. In some embodiments, the this selection can be based on other factors including the participants that have a threshold level of engagement. A level of engagement can be determined based on an analysis of the meeting content. For example, a level of engagement may be based on an analysis of the audio streams to identify users who are speaking in the meeting. This can include a count of any quantity including the number of words, number of minutes, or any other unit of measure for quantifying a level of engagement. A more granular analysis can determine a score that indicates how much a person is speaking better also may only count contributions that are relevant to a particular topic. The determination of the engagement level is not limited to speech input, it can also include scoring other forms of communication, such as gestures captured by a camera, files shared by a user, messages in a thread, etc. For example, if a person is demonstrating strong speaking skills during a meeting and other users agree, that person is selected because they match the skillset of an identified role.

Figure 2D:
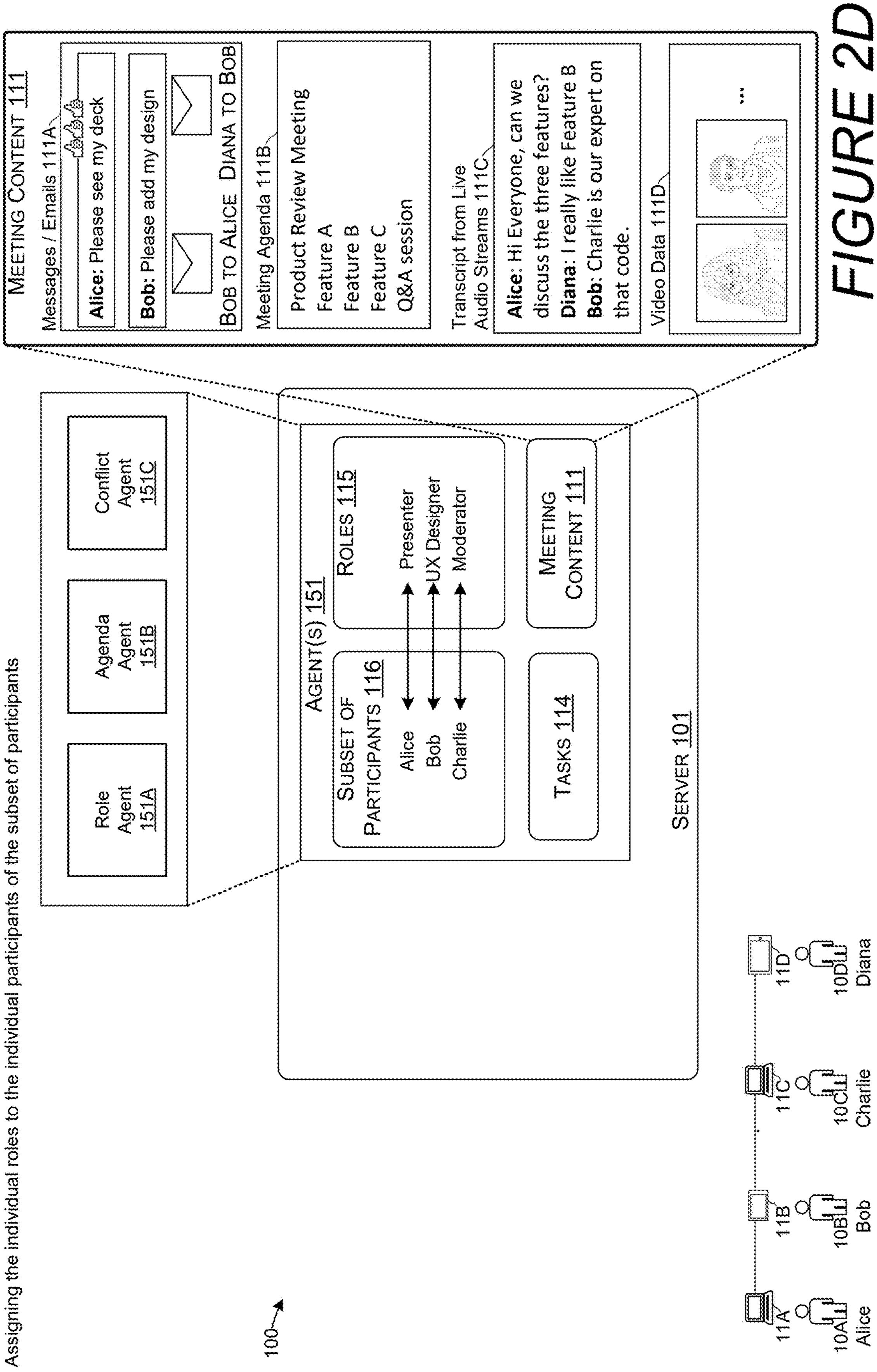
FIG. 2D shows a state where the system is assigning the individual roles to the individual participants of the subset of participants.

As shown in FIG. 2D, the system may assign roles to only a select subset of the attendees, instead of everyone. With reference to the example described above, Alice, Bob and Charlie are assigned roles, and Diana is not assigned to a role based on an analysis of the meeting content. In this example, Alice is assigned to a presenter role, Bob is assigned to a UX designer role, and Charlie is assigned to a moderator role. Although the present example involves roles such as a presenter, UX designer, and moderator, it can be appreciated that the disclosed techniques can include any other suitable role, such as Engineering Manager, Architect, etc.

Figure 2E:
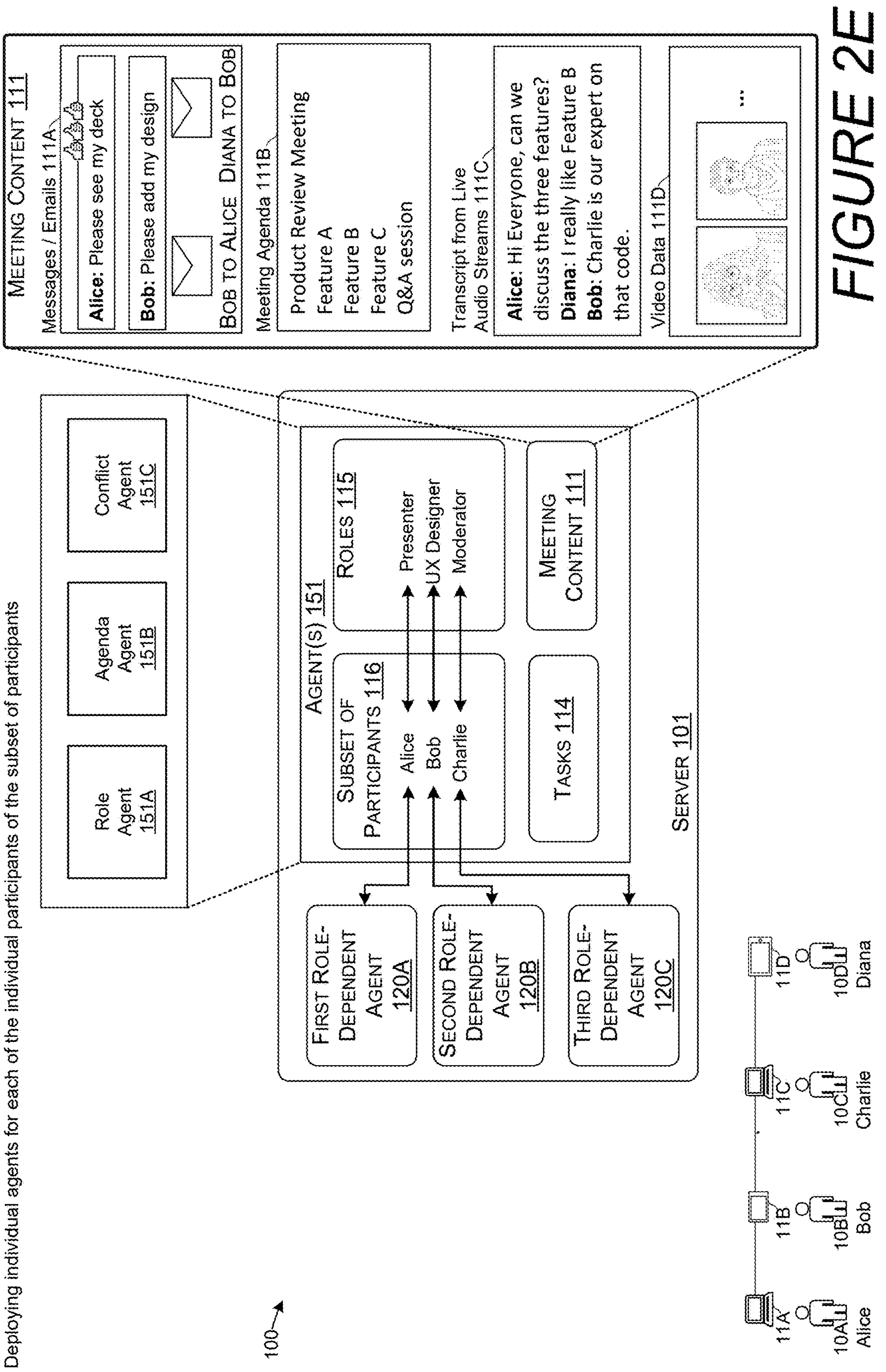
FIG. 2E shows a state where the system is deploying the individual roles to the individual participants of the subset of participants.

As shown in FIG. 2E, once the system determines various roles for the attendees, the system, on-the-fly, provides to a specific attendee a specialized role-dependent AI agent specific to the role of that attendee. The role-dependent AI agent is configured to guide and coach the attendee to perform functions mapping to the role. The system provides different agents to attendees with different roles based on the role determination. In this example, a first agent 120A configured to specialize in assisting a presenter is assigned to Alice; a second agent 120B configured to specialize in assisting a UX designer is assigned to Bob; and a third agent 120C configured to specialize in assisting a moderator is assigned to Charlie.

Figure 2F:
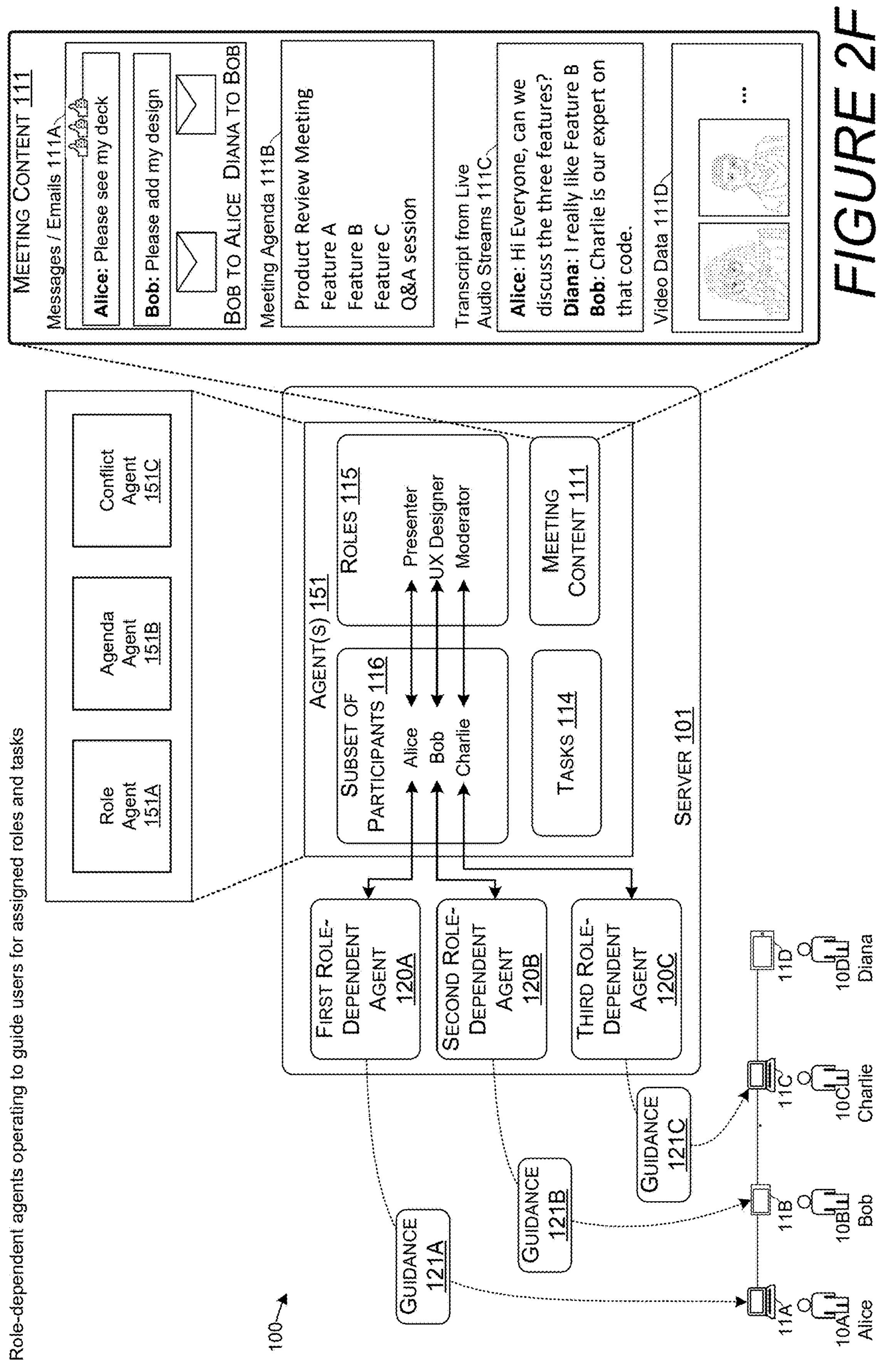
FIG. 2F shows a state where the role-dependent agents are providing guidance to the subset of participants.

As shown in FIG. 2F, each of the assigned agents 120 can generate guidance for each of the subset of users depending on their role. The guidance can be in the form of generated content such as a text message or a file, the system may also generate presentation documents, spreadsheets, word documents, etc. The guidance can be in the form of suggestive messages within a chat to help keep the person on task, remind them of their schedule and let them know of any updates to an agenda. The agent can also analyze other meaning content and updates to the meeting content to provide contextually relevant suggestions or updated content to help each participant fulfill the tasks associated with their assigned roles.

Figure 3:
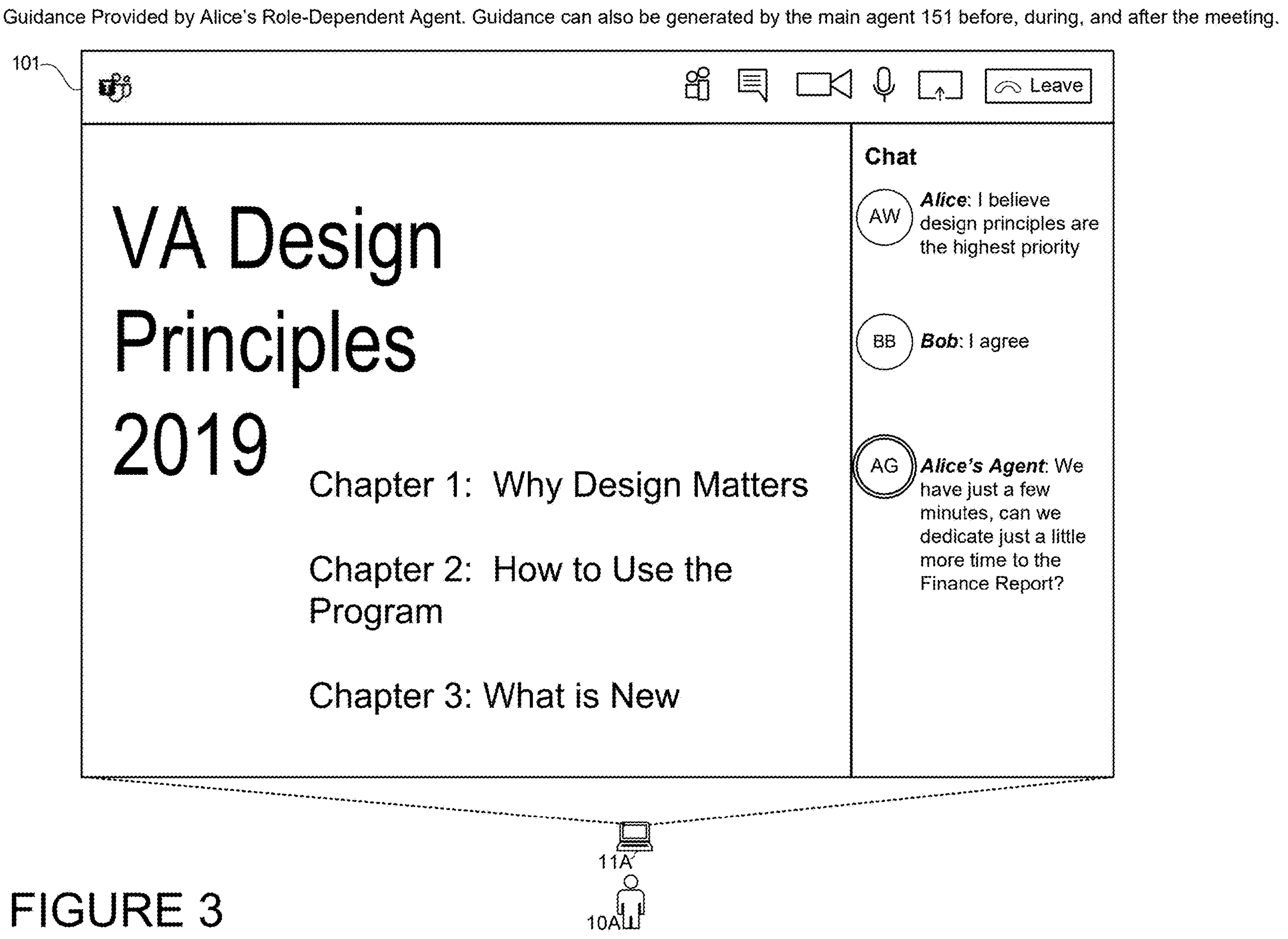
FIG. 3 shows one example how guidance is delivered from a role-dependent agent to an assigned participant.

FIG. 3 shows one example of how guidance is delivered from a role-dependent agent to an assigned participant. In this example, a role-dependent agent that is deployed and assigned to Alice is communicating to Alice via a chat session. In some embodiments, the messages and other forms of guidance are communicated to all users. In other embodiments, the messages and other forms of guidance are set with permissions causing the system to only share the guidance with the assigned user, e.g., in this case Alice. Thus, Alice is the only participant that can see the messages generated by the agent assigned to her. This way, Alice can focus on the chat and still receive guidance from her agent in a secure way. This improves the security of the system in that an agent that is tailored for Alice can communicate secure data to Alice while allowing Alice to focus on one source of information for messages of a meeting. The guidance can also be in the form of voice instructions or other forms of communication, e.g., a computer-generated video of a bot performing sign language, etc. The guidance can also be an independent thread with the assigned user, instead of in a group chat.

Figure 4A:
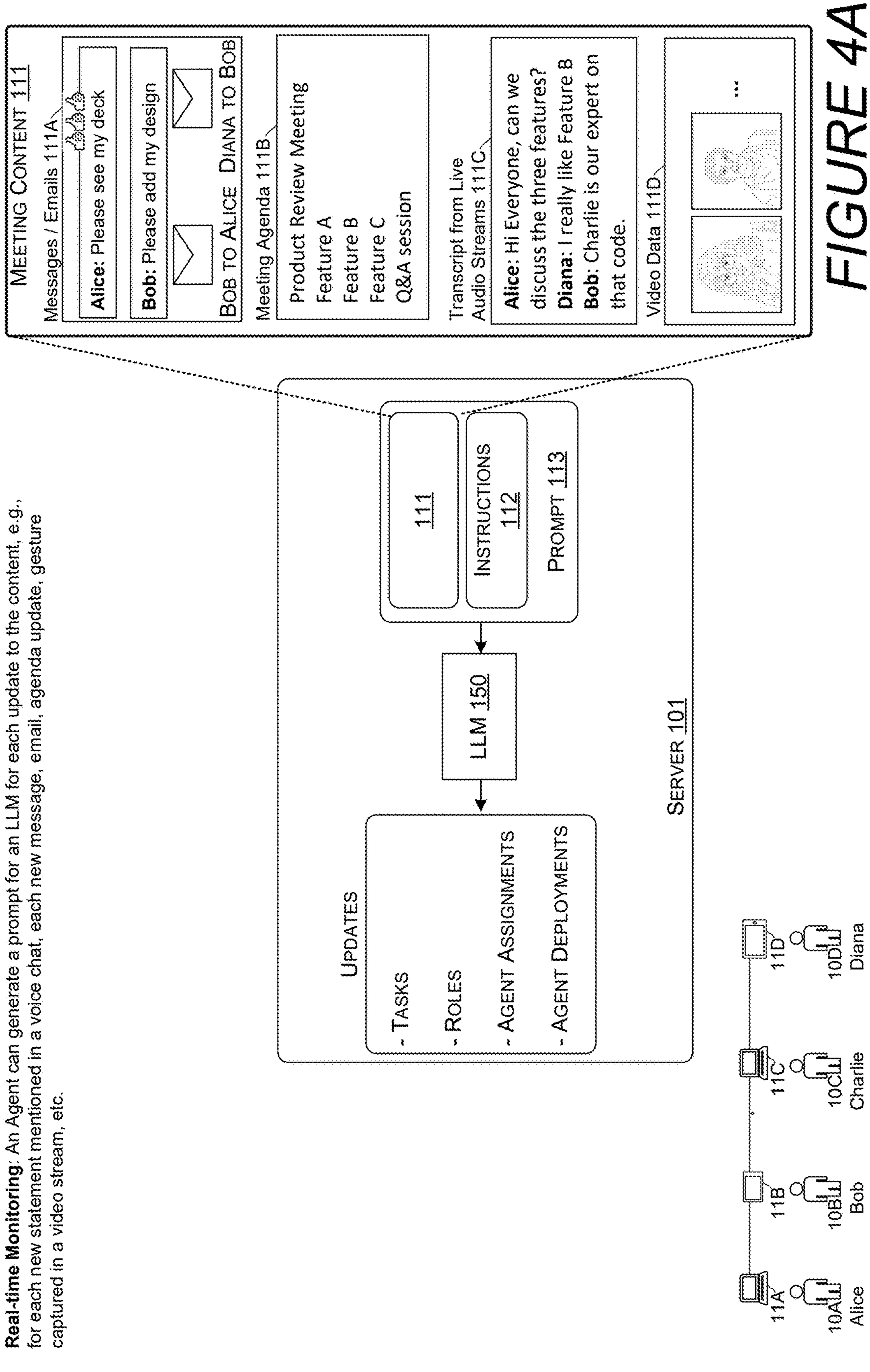
FIG. 4A shows an example of how the agent of the system is used to generate real time updates to the roles and agent allocations.

FIG. 4A shows an example of how the agent of the system is used to generate real time updates to the agent allocations. As described above, in some embodiments, each time an update is made to meeting content, e.g., when a person makes a new statement on the chat or a live audio stream, what an online profile is updated, an agenda is adjusted, or an org chart is adjusted, this system can generate a new prompt 113 with new instructions 112 that cause the LLM to process the updated meeting content 111 to generate updates to a task, role, role assignments, agent assignments, or agent deployments. By continuously analyzing participant engagement, expertise, and preferences, it assigns roles dynamically, adjusts the agenda, and resolves conflicts in ways that are optimal and contextually relevant, something traditional systems do not achieve.

Figure 4B:
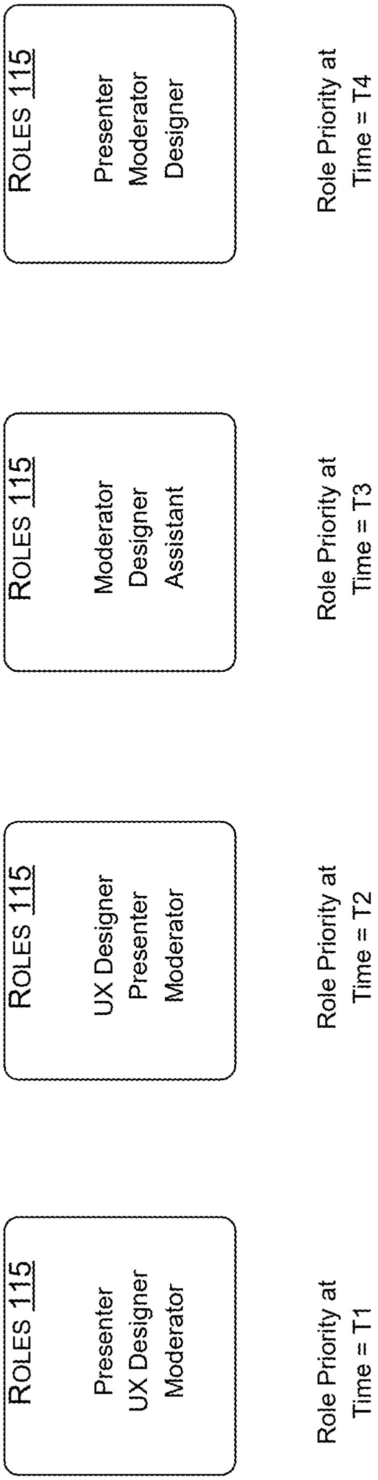
FIG. 4B shows an example of how the agent of the system is used to generate real time updates to the roles.

FIG. 4B shows an example of how the agent of the system is used to generate real time updates to the roles. As shown, and similar to the tables described above, topics and roles can change over time as the situation of the meeting changes. When the system detects changes to the meeting content, e.g., a conversation flow on a topic, the needs of the meeting change, and the roles can dynamically change. In this example, the roles starts at Time=T1, where a first set of roles are selected, then as the conversations progress and a context of the conversation indicates a need for different tasks or roles, the system can select as second set of roles, as shown at Time=T2. As shown at Time=T3 and beyond, the system can select different sets of roles based on the context that is determined from the changes to the meeting content.

Figure 5:
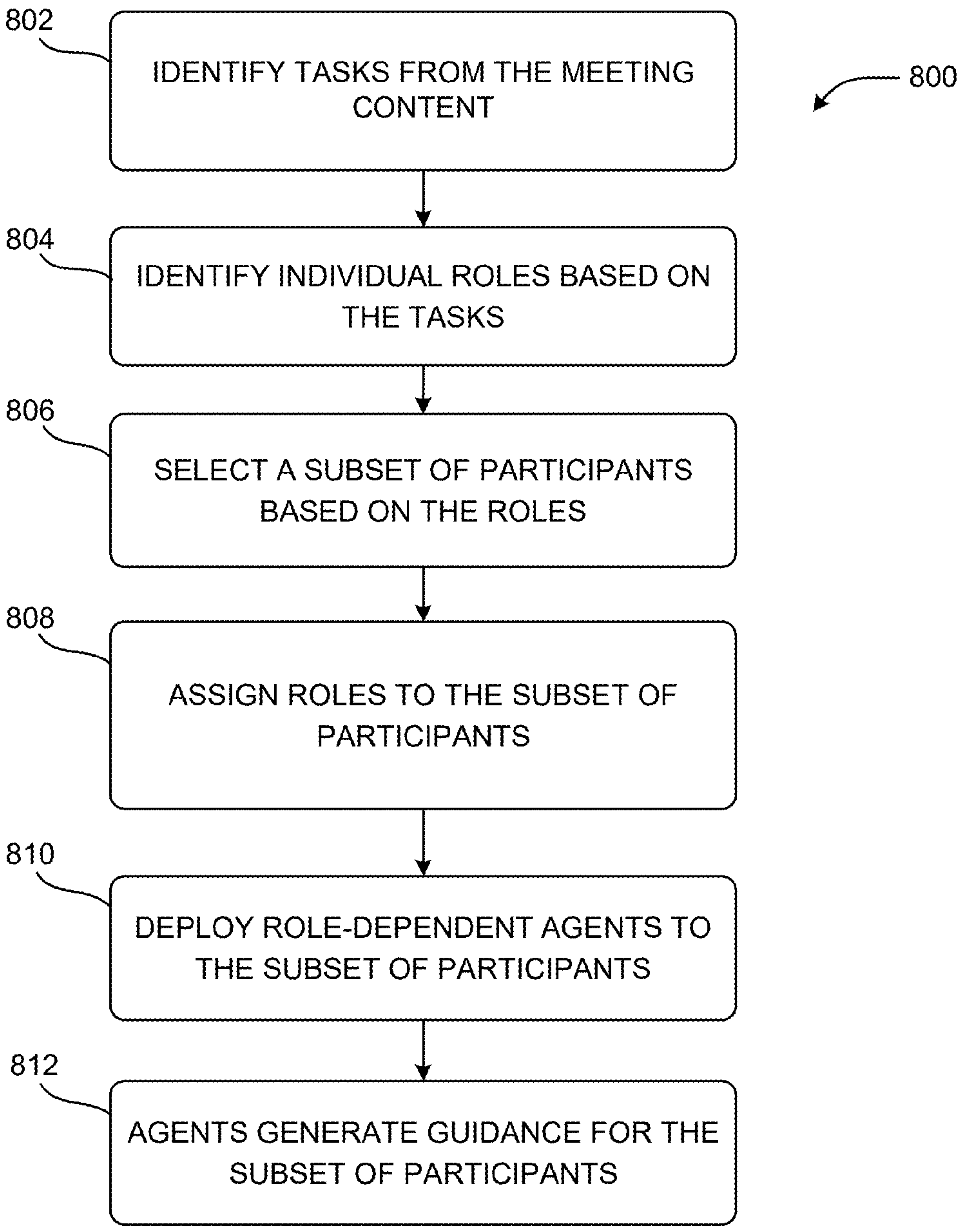
FIG. 5 is a flow diagram showing aspects of a routine for implementing aspects of the disclosed techniques.
Figure 6:
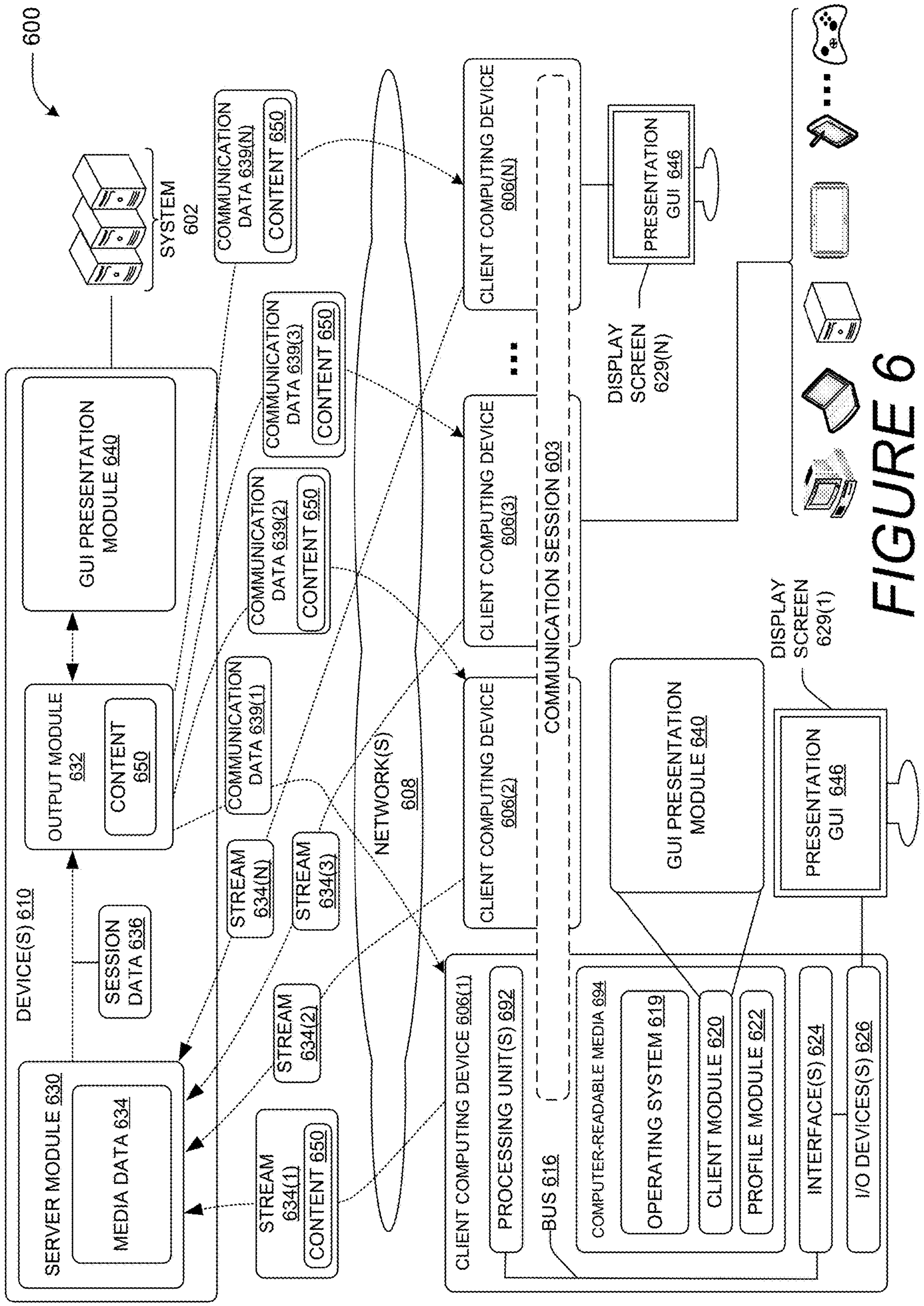
FIG. 6 is a diagram illustrating a distributed computing environment capable of implementing aspects of the techniques and technologies presented herein.
Figure 7:
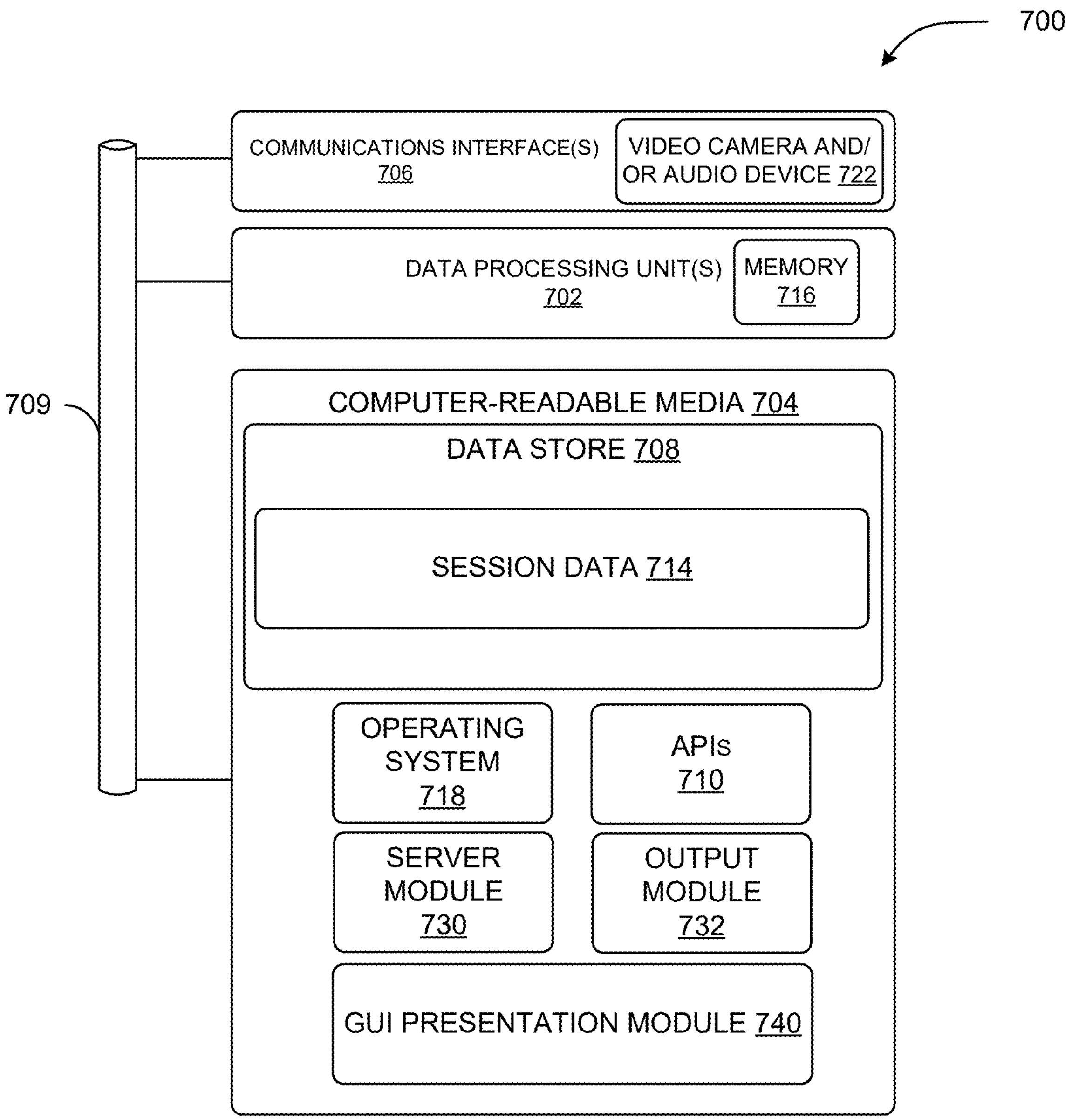
FIG. 7 is a computer architecture diagram illustrating a computing device architecture for a computing device capable of implementing aspects of the techniques and technologies presented herein.

Turning now to FIG. 5, the following section describes aspects of a routine 800 for implementing aspects of the disclosed techniques. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine are described herein as being implemented, at least in part, by an application, component and/or circuit, such as a device module that can be included in any one of the memory components disclosed herein, including but not limited to RAM. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine may be also implemented in many other ways. For example, the routine may be implemented, at least in part, by a processor or circuit of another remote computer (which can be a server) or a local processor or circuit of a local computer (which can be a client device receiving a message or a client device sending the message). Any aspect of the routine, which can include the generation of a prompt, communication of any of the messages with the prompt to an Natural Language Processing (NLP) algorithm, use of an NLP algorithm, or a display of a result generated by an NLP algorithm, can be performed on either a device sending a message, a device receiving a message, or on a server managing communication of the messages for a thread. In addition, one or more of the operations of the routine may alternatively or additionally be implemented, at least in part, by a chipset working alone or in conjunction with other software modules. Any service, circuit or application suitable for providing input data indicating the state of any device may be used in operations described herein.

The routine 800 starts at operation 802, where the system identifies tasks. The tasks 114 are each determined from analysis of at least one of a meeting agenda 111B, prior or parallel message communications 111A relating to the meeting, and a context of live vocal communication discussion 111C between the plurality of participants 10. The context of any meeting content can be analyzed using a large language model to determine the task.

In operation 804, the system identifies individual roles based on the tasks. In some embodiments, the individual roles are selected based a threshold match between requirements for individual tasks and skillset of the individual roles. Each role can have keywords and/or a description skillset and the task can have keywords and/or a description of the requirements, and the system can generate matching score between each task and each role. The roles and tasks having a threshold matching score can cause the system to select the appropriate roles based on the matching tasks. In some embodiments, the system identifies the individual roles (115) based on the tasks (114), wherein the individual roles (115) are selected based on a mapping of the individual tasks and the individual roles, wherein the mapping of the individual tasks and the individual roles include determining a threshold match between requirements for individual tasks (114) and skillset of the individual roles (115). In some embodiments, the system identifies the individual roles (115) based on the tasks (114), wherein the individual roles (115) are selected based on a mapping of the individual tasks and the individual roles. The mapping can be based on a chart that makes a direct association between tasks and roles. For example, a chart can include a first role, UX designer, and associate a number of tasks for that role, e.g., lead discussion on coding or bug fixes, analyze code, adjust a timeline of a coding schedule, etc. By using this mapping, the system can select a role based on a task, or select a task based on any given role.

In operation 806, the system selects a subset of participants based on the roles. This operation can include selecting a subset of participants from the plurality of participants of the meeting, the selection of the subset of participants being based on activity detected from the subset of participants having matching criteria with respect to one or more skillsets of the individual roles, wherein the activity detected from the subset of participants includes at least one of a level of speech activity, prior or live message communication, or a context of a live discussion between the plurality of participants. In some embodiments, each person of a subset of participants can be selected based on a mapping of a role to an attribute of a user profile. For example, attributes of a profile can include a job title, a preset job function or even a preset role assignment, such as a predetermined role assignment for specific person. When a role is selected, a person having a matching attribute in their profile is selected as part of the subset of participants.

In operation 808, the system can assign roles to only a select subset of the attendees. In some embodiments, this selection can be based on the Nash selection of the subset of participants described above. In some embodiments, the this selection can be based on other factors including the participants that have a threshold level of engagement. A level of engagement can be determined based on an analysis of the meeting content. For example, a level of engagement may be based on an analysis of the audio streams to identify users who are speaking in the meeting.

In some embodiments, the system assigns the individual roles to the individual participants of the subset of participants, wherein the assignment of an individual role to an individual participant is based a proficiency identified for the individual role having matching criteria with the activity of the individual participant.

In operation 810, the system deploys a specific attendee a specialized role-dependent AI agent specific to the role of that attendee. This operation includes deploying individual agents for each of the individual participants of the subset of participants, wherein an agent of the individual agents is deployed to perform a set of functions that map to the individual role of the individual participant, the agent is deployed for performing one or more tasks for the individual participant.

In the example described above, the system deploys three agents for Alice, Bob, and Charlie. Role-dependent agents are not deployed for Diana. In this example, the system role-dependent agents include a first specialized agent 120A configured to perform a first set of functions pertaining to a first role 115A of the first participant 10A, a second specialized agent 120B configured to perform a second set of functions pertaining to a second role 115B of the second participant 10C, and a third specialized agent 120C configured to perform a third set of functions pertaining to a third role 115A of a third participant 10F. The first set of functions generating a first displayed output for guiding the first participant to perform tasks that map to the first role, the second set of functions generating a second displayed output for guiding the second participant to perform tasks that map to the second role, and the third set of functions generating a third displayed output for guiding the third participant to perform tasks that map to the third role.

In operation 812, each of the agents generate guidance for each of the subset of users depending on their role. The guidance can be in the form of generated content such as a text message or a file, the system may also generate presentation documents, spreadsheets, word documents, etc. The guidance can be in the form of suggestive messages within a chat to help keep the person on task, remind them of their schedule and let them know of any updates to an agenda. The agent can also analyze other meaning content and updates to the meeting content to provide contextually relevant suggestions or updated content to help each participant fulfill the tasks associated with their assigned roles.

The system provides individual agents for each of the individual participants of the subset of participants, wherein an agent of the individual agents is deployed to perform a set of functions that map to the individual role of the individual participant. An agent that is configured and deployed to perform a set of functions that map to the individual role is referred to herein as a role-dependent agent. In some cases, the role-dependent agents are deployed for performing the one or more determined tasks for the assigned participant.

For a role shared by multiple attendees in the meeting, the system tracks interactions of each agent and the activity of each attendee of that role, and required functions for that role. If a required function is performed by one of the attendees of that role, the system does not surface similar function or guidance to other attendees in that role. Such features can include operations where a first role-dependent agent is generated and deployed for a first participant. The first participant and a second participant are selected as part of a subset of participants are assigned the same role based on indications of the meeting content. In some embodiments, deploying individual agents for each of the individual participants of the subset of participants further comprises: deploying a second agent for performing the one or more tasks for a second participant, the second agent is deployed to perform the set of functions that map to the individual role that is also assigned to the second participant, wherein the system tracks the interactions between the first agent and the second agent to mitigate duplication of tasks performed by the first agent and the second agent.

The role-dependent agents can be configured to be specialized in a set of functions using a number of techniques. First, a role-dependent agent can include a specific set of grounding data that can used in a prompt to an LLM. The grounding data can include behavioral information for a specific task. For example, a UX Designer agent can be assigned to a UX Designer role, and the UX Designer agent can include grounding data that includes code and coding techniques for guiding a user through a coding process. This allows for an agent to specialize in a set of functions, coaching a person how to design and code a UI, and provide more granular detail on how those functions are to be performed, vs a general agent that has a broader function set. Each role-dependent agent that is configured with its own grounding data and prompts can all share the same or different LLMs.

Although the examples described herein refer to the use of a large language model, the techniques disclosed herein can utilize any combination of suitable Natural Language Processing (NLP) algorithms that analyze and model interactions between devices and human language. This can include, but is not limited to, any suitable combination of algorithms such as Tokenization algorithms that divide a text into individual words or tokens; Part-of-Speech (POS) Tagging algorithms that assign grammatical labels (e.g., noun, verb, adjective) to each word in a sentence, helping to analyze sentence structure; Named Entity Recognition (NER) algorithms that identify and classify named entities, such as names of people, places, organizations, and more within a text; Sentiment Analysis algorithms that determine the sentiment or emotional tone of a piece of text, and classifying it as positive, negative, or neutral; Text Classification algorithms that categorize text documents into predefined classes or categories, such as topic classification and sentiment analysis; Machine Translation algorithms, like neural machine translation (NMT), automatically translate text from one language to another; Language Modeling algorithms, including n-grams and neural language models, an also to referred to herein as a large language model (LLM) or a "language model," are used to predict the probability of a word or sequence of words given the context of the preceding words; Named Entity Disambiguation algorithms which help disambiguate the meaning of named entities by linking them to specific entities in a knowledge base or resolving them to their appropriate entities; Text Summarization algorithms that generate concise summaries of longer texts, which can be extractive (selecting and combining sentences) or abstractive (generating new sentences); Speech Recognition algorithms, since the system may process speech messages and not just text messages; Information Extraction algorithms that identify structured information from unstructured text, for extracting events or facts from articles or message attachments; Coreference Resolution algorithms that determine which words or phrases in a text refer to the same entity, e.g., identifying that "he" and "John" refer to the same person in a sentence; Question Answering algorithms that answer questions posed in natural language by extracting relevant information from text corpora or knowledge bases; Word Embeddings algorithms that represent words as dense, continuous-valued vectors, which capture semantic relationships between words; Text Generation algorithms that use Recurrent Neural Networks (RNNs) and Transformers to create human-like text, including chatbots, content generation, and creative writing, Dependency Parsing algorithms that analyze the grammatical structure of sentences by identifying the relationships between words, including subjects, objects, and modifiers; Topic Modeling algorithms, such as Latent Dirichlet Allocation (LDA), to uncover the underlying topics in a collection of documents; and Language Generation algorithms that create coherent and contextually relevant language, such as generating human-like responses in a conversational AI system. In some embodiments, the system can also utilize audio-to-audio models, where audio files or audio streams are communicated to the model with a prompt for causing the models to generate the responses described herein.

The invention discloses a method of dynamically assigning AI agents and roles to the participants of the virtual meeting. The system determines the task to be accomplished based on agenda of the meeting, prior and parallel communication and context of the discussion. Further, the role assignment is decided based on who the active speakers are, hierarchy of an organization and agenda of the meeting. Specific agents are assigned to specific users. In some embodiments, a person having a higher ranking within an organizational chart is selected to fill a role over a person having a lower relative ranking. Thus, if the shared content indicates that they are both qualified to fill a role, e.g., by an analysis of a live conversation, engagement level, and historical information showing equal experience in a particular role pertaining to a particular topic, the system will assign the role to the higher ranked person, or in some cases, the system will select both of the participants.

Turning now to FIG. 8, a diagram illustrating an example environment 600 in which a system 602 can implement the disclosed techniques is shown. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 603. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603. A communication session 603 can include a call, which can be a direct call from a person to others, a communication session 603 can also include a meeting, which is an appointment that is established by a calendar event defining attendees.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds can be communicated with the messages.

The system 602 of FIG. 8 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s)

610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses. Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a vocal input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 8 illustrates that client computing device 606(1) is in some way connected to a display device (e.g., a display screen 629(N)), which can display a UI according to the techniques described herein.

In the example environment 600 of FIG. 8, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 8) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 8, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also includes input data from each user, which can be used to control a direction and a location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

FIG. 9 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which is also referred to herein as computer-readable storage media, a computer-readable medium, or computer-readable storage medium, includes one or more of volatile memory, nonvolatile memory, and/or other persistent and/or auxiliary computer storage media, rotating storage medium such as a disk, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, computer-readable storage medium, computer-readable storage device, or computer storage medium.

A "computer-readable storage device" or a "computer-readable device" includes non-transitory computer-readable storage media such as one or more of volatile memory, nonvolatile memory implemented in any method or technology for storage of information such as computer-readable instructions, data structures, program modules, or other data. Thus, a computer-readable storage device includes tangible and/or physical forms of a hardware component that is part of a computing system or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), or flash memory, solid-state memory devices, storage arrays, network attached storage, storage area networks. The computer-readable storage device also includes a physical hardware device having circuitry and magnetic sensors, optical sensors, or other sensors for reading a compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, or any other physical locally stored medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store the primary calendar and secondary calendar, and other session data that show the status and activity level of each user. The session data can include a total number of participants (e.g., users and/or client computing devices) in a communication session, activity that occurs in the communication session, a list of invitees to the communication session, and/or other data related to when and how the communication session is conducted or hosted. For illustrative purposes, a user, attendee, invitee, or a participant are all used interchangeably without limiting the scope of the present disclosure. The data store 708 may also include session data 714, such as the meeting objects described herein. The session data 714 can also include video, audio, or other content that can be shared in a meeting. The session data can also include permissions for each user.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A computer-implemented method for managing agents for individual participants of a plurality of participants of a meeting, the computer-implemented method for execution on a system comprising:

analyzing content shared before or during the meeting to determine tasks associated with the meeting, wherein the tasks are each determined from at least one of a meeting agenda, prior or parallel message communications relating to the meeting, and a context of live vocal communication discussion between the plurality of participants;

identifying individual roles based on the tasks, wherein the individual roles are selected based on a mapping of the individual tasks and the individual roles;

selecting a subset of participants from the plurality of participants of the meeting, the selection of the subset of participants being based on a mapping of a role to an attribute of a user profile or activity detected from the subset of participants having matching criteria with respect to one of the individual roles, wherein the activity detected from the subset of participants includes at least one of a level of speech activity, prior or live message communication, or a context of a live discussion between the plurality of participants;

assigning the individual roles to the individual participants of the subset of participants, wherein the assignment of an individual role to an individual participant is based a proficiency identified for the individual role having matching criteria with the activity of the individual participant; and according to each assigned individual role, deploying an individual agent for each of the individual participants of the subset of participants, wherein the individual agent is configured to perform a first set of functions that map to the individual role of the individual participant, the agent is deployed for performing one or more tasks for the individual participant, and the agent is not deployed for a participant not having the corresponding assigned individual role, the agent that is configured to perform the first set of functions is separate and operates independently from a second agent assigned to another role, the second agent is configured to perform a second set of functions that is separate and different than the first set of functions.

2. The computer-implemented method of claim 1, wherein the agent is a first agent, the individual participant is a first participant, the first participant and a second participant of the subset of participants are assigned the same role, wherein deploying individual agents for each of the individual participants of the subset of participants further comprises:

deploying a second agent for performing the one or more tasks for a second participant, the second agent is deployed to perform the set of functions that map to the individual role that is also assigned to the second participant, wherein the system tracks the interactions between the first agent and the second agent to mitigate duplication of tasks performed by the first agent and the second agent.

3. The computer-implemented method of claim 1, wherein the prior or parallel message communications relating to the meeting include emails or message that are to or from any one of the participants of the meeting, the meeting content further includes the agenda authored or edited by any one of the participants of the meeting, wherein the context of live vocal communication discussion between the plurality of participants includes an analysis of a live and historical transcription of audio streams communicated between the participants of the meeting, the analysis including communicating the live and historical transcription of audio streams to a large language model with instructions causing the LLM to determine the context, wherein the mapping of the individual tasks and the individual roles include determining a threshold match between requirements for individual tasks and skillset of the individual roles, wherein the individual agents include:

a first specialized agent configured to perform a first set of functions pertaining to a first role of the first participant, a second specialized agent configured to perform a second set of functions pertaining to a second role of the second participant, and a third specialized agent configured to perform a third set of functions pertaining to a third role of a third participant, wherein the first set of functions generating a first displayed output for guiding the first participant to perform tasks that map to the first role, the second set of functions generating a second displayed output for guiding the second participant to perform tasks that map to the second role, and the third set of functions generating a third displayed output for guiding the third participant to perform tasks that map to the third role.

4. The computer-implemented method of claim 1, wherein identifying individual roles based on the tasks comprises selecting the individual roles based the threshold match between the requirements for individual tasks and skillset of the individual roles, and wherein selecting the subset of participants from the plurality of participants of the meeting is based on activity detected from the subset of participants having matching criteria with respect to one or more skillsets of the individual roles, wherein the activity detected from the subset of participants includes at least one of a level of speech activity, prior or live message communication, or a context of a live discussion between the plurality of participants, wherein the activity detected from a first participant of the subset of participants indicates experience or high engagement of the level of speech activity, a level of participation in prior or live messages relevant to a topic selected for the first participant, or the context of a live discussion between the plurality of participants.

5. The computer-implemented method of claim 1, further comprising:

determining that a first user contributed a quantity of the content greater than a threshold quantity of meeting content, wherein the quantity of the content can include a number of words spoken, a length of time of vocal input to a meeting, or a value quantifying shared comments or shared documents;

in response to determining that the first user contributed the quantity of the content greater than the threshold quantity of meeting content:

adjusting priority scores for the first user to reduce a priority of a task or a priority of a role for the first user, wherein the selection of the first user as being in the subset of participants is based on the priority of the task or the priority of the role for the first user being above a threshold priority, and adjusting priority scores for a second user to increase a priority of a task or a priority of a role for the second user, wherein the selection of the second user as being in the subset of participants is based on the priority of the task or the priority of the role for the second user being above the priority threshold.

6. The computer-implemented method of claim 1, further comprising:

analyzing real-time updates to the content shared during the meeting to determine a second set of tasks associated with the meeting, wherein the second set of tasks are each determined from at least one of the meeting agenda, the prior or parallel message communications relating to the meeting, and the context of live vocal communication discussion between the plurality of participants;

determining a second set of roles based on the second set of tasks;

selecting a second subset of participants from the plurality of participants of the meeting, the selection of the second subset of participants being based on activity detected from the second subset of participants having matching criteria with respect to one or more skillsets of the individual roles, wherein the activity detected from the second subset of participants includes at least one of the level of speech activity, the prior or live message communication, or the context of the live discussion between the plurality of participants;

assigning second set of roles to the individual participants of the second subset of participants, wherein the assignment of a second individual role to the individual participants of the second subset of participants is based a proficiency identified for the second individual role having matching criteria with the activity of the individual participants of the second subset of participants; and deploying a second set of individual agents for each of the individual participants of the second subset of participants, wherein a second agent of the second set of agents is deployed to perform a second set of functions that map to the second individual role of the individual participants of the second subset of participants, the second agent is deployed for performing one or more tasks for the individual participants of the second subset of participants.

7. The computer-implemented method of claim 1, wherein selecting the subset of participants from the plurality of participants of the meeting is in response to the selection of the individual roles based on the tasks, wherein the individual roles are selected based the threshold match between requirements for individual tasks and skillset of the individual roles.

8. A computing system for managing agents for individual participants of a plurality of participants of a meeting, the computing system comprising:

one or more processing units; and a computer-readable storage medium having encoded thereon computer-executable instructions to cause the one or more processing units to:

analyze content shared before or during the meeting to determine tasks associated with the meeting, wherein the tasks are each determined from at least one of a meeting agenda, prior or parallel message communications relating to the meeting, and a context of live vocal communication discussion between the plurality of participants;

identify individual roles based on the tasks, wherein the individual roles are selected based on a mapping of the individual tasks and the individual roles;

select a subset of participants from the plurality of participants of the meeting, the selection of the subset of participants being based on a mapping of a role to an attribute of a user profile or activity detected from the subset of participants having matching criteria with respect to one of the individual roles, wherein the activity detected from the subset of participants includes at least one of a level of speech activity, prior or live message communication, or a context of a live discussion between the plurality of participants;

assign the individual roles to the individual participants of the subset of participants, wherein the assignment of an individual role to an individual participant is based a proficiency identified for the individual role having matching criteria with the activity of the individual participant; and according to each assigned individual role, deploy an individual agent for each of the individual participants of the subset of participants, wherein the individual agent is configured to perform a first set of functions that map to the individual role of the individual participant, the agent is deployed for performing one or more tasks for the individual participant, and the agent is not deployed for a participant not having the corresponding assigned individual role, the agent that is configured to perform the first set of functions is separate and operates independently from a second agent assigned to another role, the second agent is configured to perform a second set of functions that is separate and different than the first set of functions.

9. The computing system of claim 8, wherein the agent is a first agent, the individual participant is a first participant, the first participant and a second participant of the subset of participants are assigned the same role, wherein deploying individual agents for each of the individual participants of the subset of participants further comprises:

deploying a second agent for performing the one or more tasks for a second participant, the second agent is deployed to perform the set of functions that map to the individual role that is also assigned to the second participant, wherein the system tracks the interactions between the first agent and the second agent to mitigate duplication of tasks performed by the first agent and the second agent.

10. The computing system of claim 8, wherein the individual agents include:

a first specialized agent configured to perform a first set of functions pertaining to a first role of the first participant, a second specialized agent configured to perform a second set of functions pertaining to a second role of the second participant, and a third specialized agent configured to perform a third set of functions pertaining to a third role of a third participant, wherein the first set of functions generating a first displayed output for guiding the first participant to perform tasks that map to the first role, the second set of functions generating a second displayed output for guiding the second participant to perform tasks that map to the second role, and the third set of functions generating a third displayed output for guiding the third participant to perform tasks that map to the third role.

11. The computing system of claim 8, wherein identifying individual roles based on the tasks comprises selecting the individual roles based the threshold match between the requirements for individual tasks and skillset of the individual roles, and wherein selecting the subset of participants from the plurality of participants of the meeting is based on activity detected from the subset of participants having matching criteria with respect to one or more skillsets of the individual roles, wherein the activity detected from the subset of participants includes at least one of a level of speech activity, prior or live message communication, or a context of a live discussion between the plurality of participants, wherein the activity detected from a first participant of the subset of participants indicates experience or high engagement of the level of speech activity, a level of participation in prior or live messages relevant to a topic selected for the first participant, or the context of a live discussion between the plurality of participants.

12. The computing system of claim 8, wherein the roles are assigned to an individual participant based on a characteristic of each role meeting one or more criteria with respect to the task.

13. The computing system of claim 8, wherein the instructions further cause the one or more processing units to:

analyze real-time updates to the content shared during the meeting to determine a second set of tasks associated with the meeting, wherein the second set of tasks are each determined from at least one of the meeting agenda, the prior or parallel message communications relating to the meeting, and the context of live vocal communication discussion between the plurality of participants;

determine a second set of roles based on the second set of tasks;

select a second subset of participants from the plurality of participants of the meeting, the selection of the second subset of participants being based on activity detected from the second subset of participants having matching criteria with respect to one or more skillsets of the individual roles, wherein the activity detected from the second subset of participants includes at least one of the level of speech activity, the prior or live message communication, or the context of the live discussion between the plurality of participants;

assign second set of roles to the individual participants of the second subset of participants, wherein the assignment of a second individual role to the individual participants of the second subset of participants is based a proficiency identified for the second individual role having matching criteria with the activity of the individual participants of the second subset of participants; and deploy a second set of individual agents for each of the individual participants of the second subset of participants, wherein a second agent of the second set of agents is deployed to perform a second set of functions that map to the second individual role of the individual participants of the second subset of participants, the second agent is deployed for performing one or more tasks for the individual participants of the second subset of participants.

14. The computing system of claim 8, wherein selecting the subset of participants from the plurality of participants of the meeting is in response to the selection of the individual roles based on the tasks, wherein the individual roles are selected based the threshold match between requirements for individual tasks and skillset of the individual roles.

15. A computer-readable storage medium having encoded thereon computer-executable instructions for managing agents for individual participants of a plurality of participants of a meeting, the computer-executable instructions configured to cause one or more processing units of a computing system to:

analyze content shared before or during the meeting to determine tasks associated with the meeting, wherein the tasks are each determined from at least one of a meeting agenda, prior or parallel message communications relating to the meeting, and a context of live vocal communication discussion between the plurality of participants;

identify individual roles based on the tasks, wherein the individual roles are selected based on a mapping of the individual tasks and the individual roles;

select a subset of participants from the plurality of participants of the meeting, the selection of the subset of participants being based on a mapping of a role to an attribute of a user profile or activity detected from the subset of participants having matching criteria with respect to one of the individual roles, wherein the activity detected from the subset of participants includes at least one of a level of speech activity, prior or live message communication, or a context of a live discussion between the plurality of participants;

assign the individual roles to the individual participants of the subset of participants, wherein the assignment of an individual role to an individual participant is based a proficiency identified for the individual role having matching criteria with the activity of the individual participant; and according to each assigned individual role, deploy an individual agent for each of the individual participants of the subset of participants, wherein the individual agent is configured to perform a first set of functions that map to the individual role of the individual participant, the agent is deployed for performing one or more tasks for the individual participant, and the agent is not deployed for a participant not having the corresponding assigned individual role, the agent that is configured to perform the first set of functions is separate and operates independently from a second agent assigned to another role, the second agent is configured to perform a second set of functions that is separate and different than the first set of functions.

16. The computer-readable storage medium of claim 15, wherein the agent is a first agent, the individual participant is a first participant, the first participant and a second participant of the subset of participants are assigned the same role, wherein deploying individual agents for each of the individual participants of the subset of participants further comprises:

deploying a second agent for performing the one or more tasks for a second participant, the second agent is deployed to perform the set of functions that map to the individual role that is also assigned to the second participant, wherein the system tracks the interactions between the first agent and the second agent to mitigate duplication of tasks performed by the first agent and the second agent.

17. The computer-readable storage medium of claim 15, wherein the individual agents include:

a first specialized agent configured to perform a first set of functions pertaining to a first role of the first participant, a second specialized agent configured to perform a second set of functions pertaining to a second role of the second participant, and a third specialized agent configured to perform a third set of functions pertaining to a third role of a third participant, wherein the first set of functions generating a first displayed output for guiding the first participant to perform tasks that map to the first role, the second set of functions generating a second displayed output for guiding the second participant to perform tasks that map to the second role, and the third set of functions generating a third displayed output for guiding the third participant to perform tasks that map to the third role.

18. The computer-readable storage medium of claim 15, wherein identifying individual roles based on the tasks comprises selecting the individual roles based the threshold match between the requirements for individual tasks and skillset of the individual roles, and wherein selecting the subset of participants from the plurality of participants of the meeting is based on activity detected from the subset of participants having matching criteria with respect to one or more skillsets of the individual roles, wherein the activity detected from the subset of participants includes at least one of a level of speech activity, prior or live message communication, or a context of a live discussion between the plurality of participants, wherein the activity detected from a first participant of the subset of participants indicates experience or high engagement of the level of speech activity, a level of participation in prior or live messages relevant to a topic selected for the first participant, or the context of a live discussion between the plurality of participants.

19. The computer-readable storage medium of claim 15, wherein the roles are assigned to an individual participant based on a characteristic of each role meeting one or more criteria with respect to the task.

20. The computer-readable storage medium of claim 15, wherein the instructions further cause the one or more processing units to:

analyze real-time updates to the content shared during the meeting to determine a second set of tasks associated with the meeting, wherein the second set of tasks are each determined from at least one of the meeting agenda, the prior or parallel message communications relating to the meeting, and the context of live vocal communication discussion between the plurality of participants;

determine a second set of roles based on the second set of tasks;

select a second subset of participants from the plurality of participants of the meeting, the selection of the second subset of participants being based on activity detected from the second subset of participants having matching criteria with respect to one or more skillsets of the individual roles, wherein the activity detected from the second subset of participants includes at least one of the level of speech activity, the prior or live message communication, or the context of the live discussion between the plurality of participants;

assign second set of roles to the individual participants of the second subset of participants, wherein the assignment of a second individual role to the individual participants of the second subset of participants is based a proficiency identified for the second individual role having matching criteria with the activity of the individual participants of the second subset of participants; and deploy a second set of individual agents for each of the individual participants of the second subset of participants, wherein a second agent of the second set of agents is deployed to perform a second set of functions that map to the second individual role of the individual participants of the second subset of participants, the second agent is deployed for performing one or more tasks for the individual participants of the second subset of participants.

* * * * *